United States Patent
Kira et al.

(10) Patent No.: US 8,600,971 B2
(45) Date of Patent: Dec. 3, 2013

(54) INFORMATION PROCESSING APPARATUS, STORAGE MEDIUM, INFORMATION PROCESSING METHOD AND INFORMATION PROCESSING SYSTEM FOR EXAMINING AN OBJECT ON AN IMAGED IMAGE

(75) Inventors: Satoshi Kira, Kyoto (JP); Kentaro Nishimura, Kyoto (JP); Shinya Saito, Kyoto (JP); Ken-ichi Minegishi, Tokyo (JP); Takamitsu Tsuji, Tokyo (JP); Naoshi Suzue, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 44 days.

(21) Appl. No.: 13/349,922

(22) Filed: Jan. 13, 2012

(65) Prior Publication Data

US 2013/0050192 A1    Feb. 28, 2013

(30) Foreign Application Priority Data

Aug. 29, 2011  (JP) ................... 2011-185533

(51) Int. Cl.
  *G06F 7/00*  (2006.01)
  *G06F 17/30*  (2006.01)
(52) U.S. Cl.
  USPC .......................................... 707/706; 382/305
(58) Field of Classification Search
  None
  See application file for complete search history.

(56) References Cited

U.S. PATENT DOCUMENTS

2005/0076004 A1  4/2005  Yanagisawa et al.
2011/0106782 A1*  5/2011  Ke et al. ................. 707/706

FOREIGN PATENT DOCUMENTS

| JP | 2002-203242 | 7/2002 |
| JP | 2003-288363 | 10/2003 |
| JP | 2005-107990 | 4/2005 |
| JP | 2008-152713 | 7/2008 |
| JP | 2008-154163 | 7/2008 |

OTHER PUBLICATIONS

Aya Soffer et al, "Pictorial Queries by Image Similarity", IEEE 1996, Proceedings of ICPR '96, 6 pages.*

* cited by examiner

*Primary Examiner* — Uyen Le
(74) *Attorney, Agent, or Firm* — Nixon & Vanderhye P.C.

(57) ABSTRACT

An example of a game apparatus includes a CPU. The CPU activates two outward cameras to allow a user to image, for example, a flower. The CPU filters data for search included in a database. The CPU obtains color information, shape information and a size of the imaged flower. A shape category is obtained, and with the shape category, data for search included in a database for search is further filtered. Then, by comparing the color information, the shape information, and the size of the imaged flower with the data for search to be used, a score of a degree of approximation of the color information and scores of the degree of matching of the shape information and size, etc. are obtained. Then, images of flowers as candidates are presented in the descending order of the score (similarity level).

14 Claims, 31 Drawing Sheets

FIG. 6
(A)
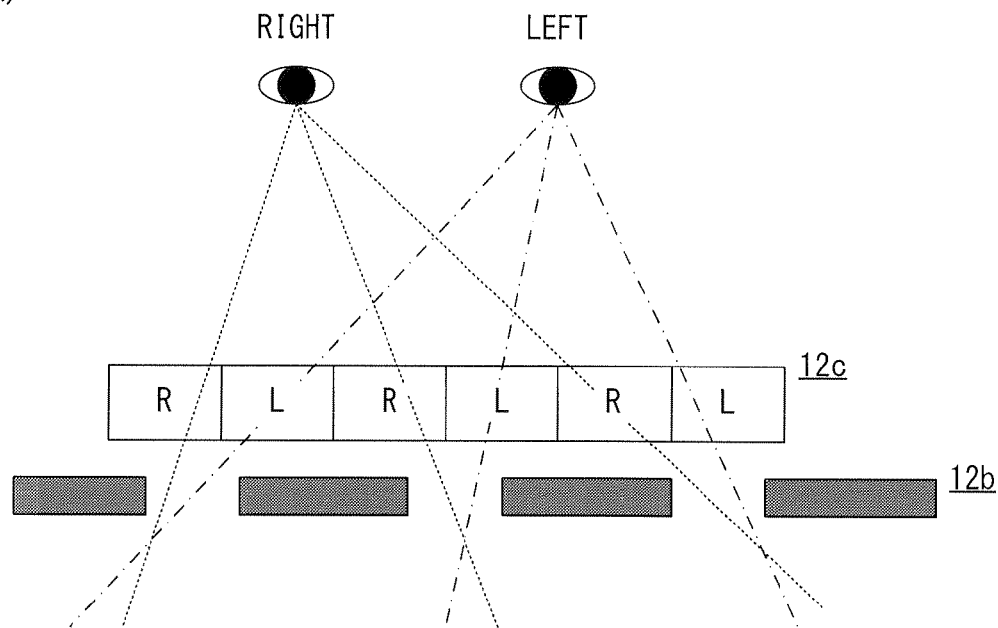
(B)
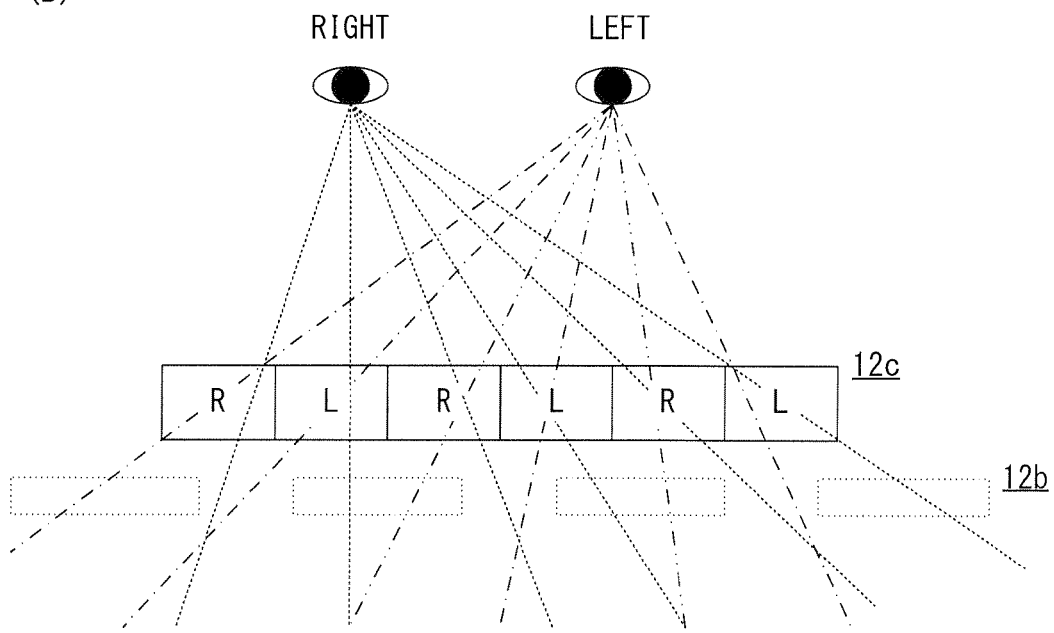

FIG. 9
(A) GROUP FINDER
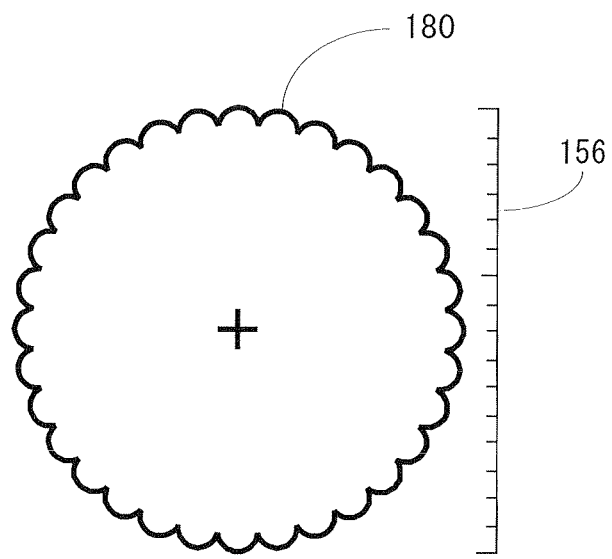
(B) SLIM FINDER
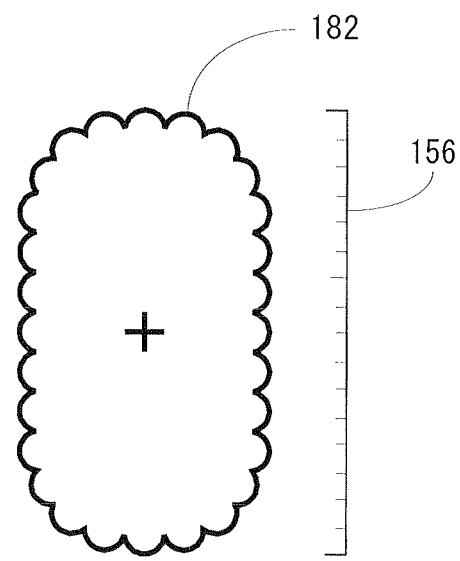

FIG. 10
(A) DOWNWARD FINDER
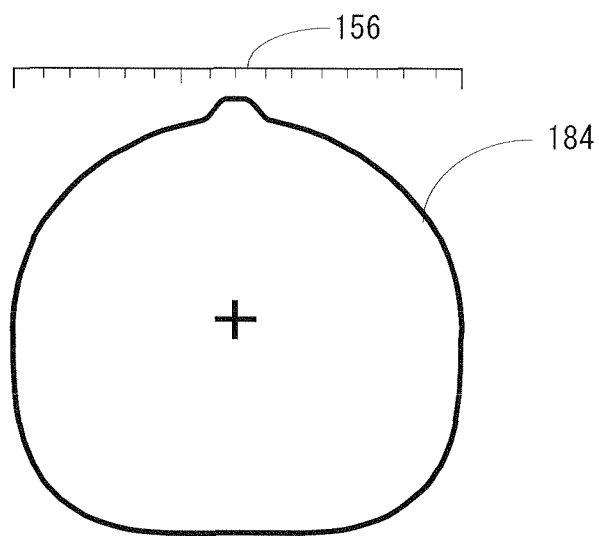
(B) SMALL FLOWER FINDER
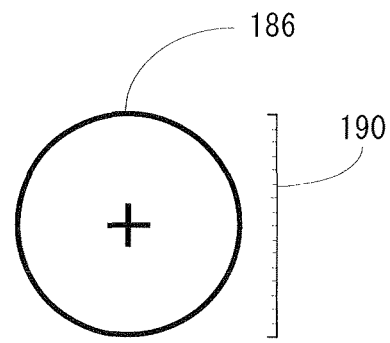

FIG. 19

OVERVIEW OF DATA FOR SEARCH

ID

| NAME OF FLOWER |
| --- |
| COLOR INFORMATION |
| HISTOGRAM |
| SHAPE INFORMATION |
| THE NUMBER OF SHORT PETALS |
| THE NUMBER OF LONG PETALS |
| PERIPHERAL LENGTH OF FLOWER |
| AREA OF FLOWER |
| COMPLEXITY OF SHAPE OF FLOWER |
| WIDTH OF RECTANGLE CIRCUMSCRIBED ABOUT OUTLINE OF FLOWER |
| HEIGHT OF RECTANGLE CIRCUMSCRIBED ABOUT OUTLINE OF FLOWER |
| SHAPE CATEGORY |
| JUDGMENT FLAG |

| CONDITION INFORMATION |
| --- |
| SIZE OF FLOWER |
| TIME OF BLOOM |
| DEGREE OF ENCOUNTER |
| HOW FLOWERS BLOOM |
| SHAPE OF FLOWER |
| KIND |
| DIRECTION OF FLOWER |
| HEIGHT OF PLANT |
| ⋮ |

| IMAGE INFORMATION |
| --- |
| REDUCED IMAGE |

FIG. 20
(A) CUT-OUT IMAGE 600
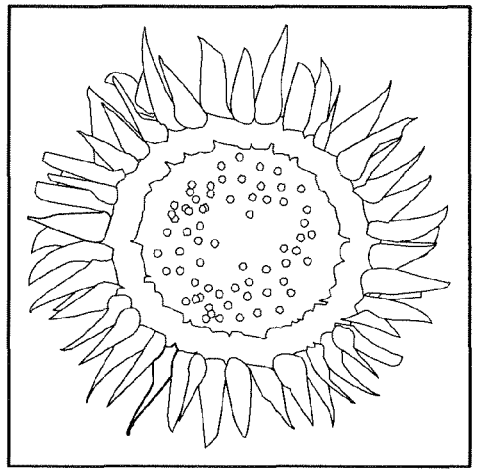
(B) EXTRACTION OF COLOR INFORMATION
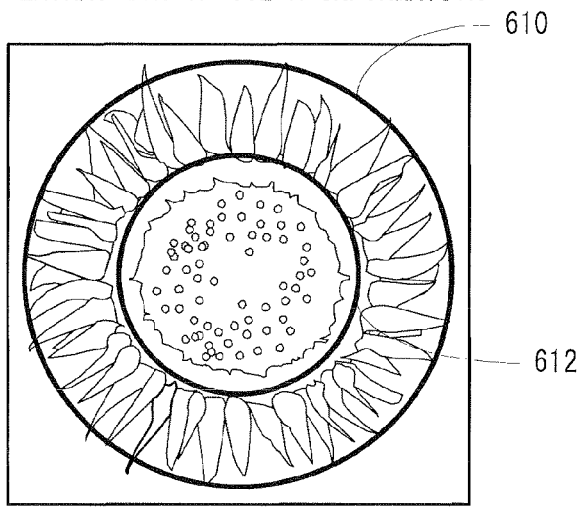
(C) EXTRACTION OF COLOR INFORMATION
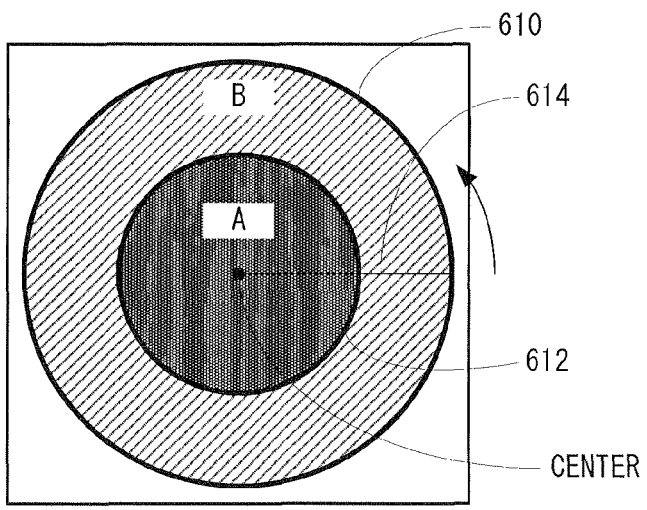

FIG. 21
(A) EXTRACTION OF SHAPE INFORMATION
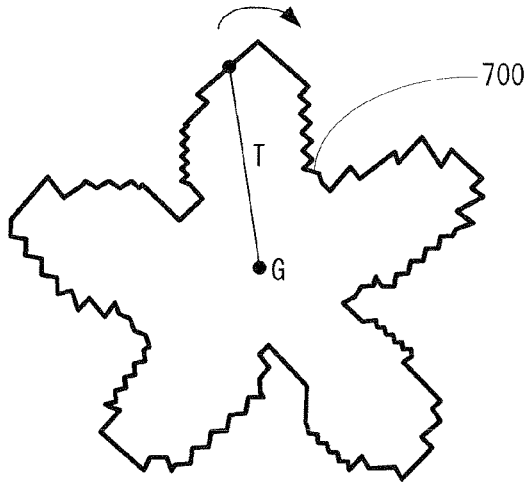
(B) SHAPE GRAPH
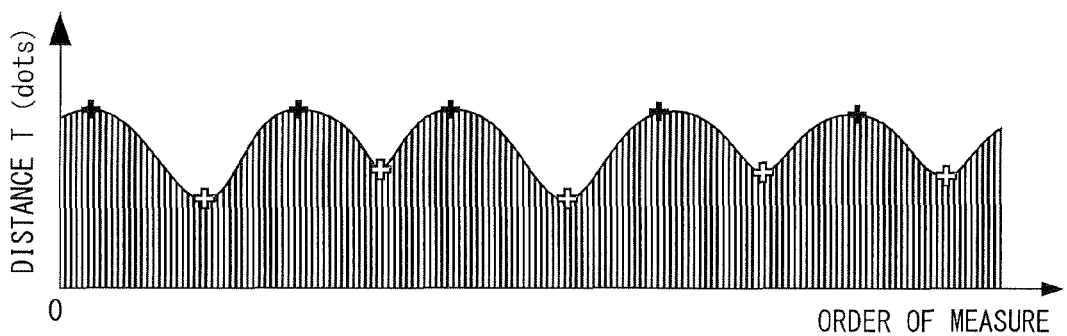
(C) RECTANGLE CIRCUMSCRIBED ABOUT OUTLINE OF FLOWER 710
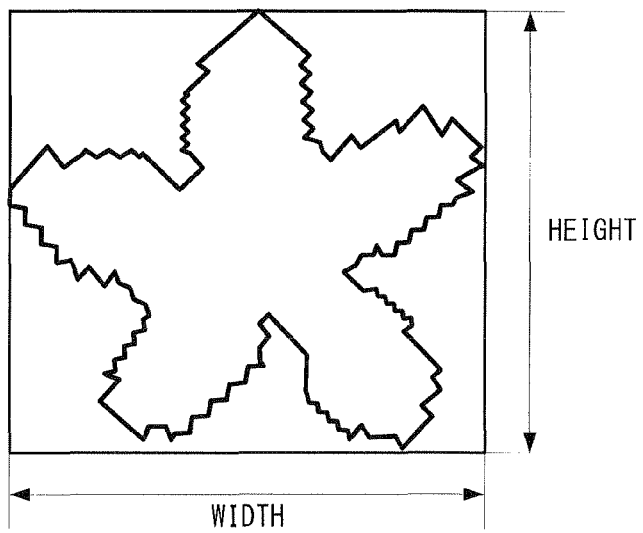

INFORMATION PROCESSING APPARATUS, STORAGE MEDIUM, INFORMATION PROCESSING METHOD AND INFORMATION PROCESSING SYSTEM FOR EXAMINING AN OBJECT ON AN IMAGED IMAGE

CROSS REFERENCE OF RELATED APPLICATION

The disclosure of Japanese Patent Application No. 2011-185533 filed on Aug. 29, 2011 is incorporated herein by reference.

FIELD

The present embodiment relates to an information processing apparatus, storage medium, information processing method and information processing system. More specifically, the present embodiment relates to an information processing apparatus, storage medium, information processing method and information processing system which examines a flower based on an imaged image.

SUMMARY

It is a primary object of the present embodiment to provide a novel information processing apparatus, storage medium, information processing method and information processing system.

Another object of the present embodiment is to provide an information processing apparatus, storage medium, information processing method and information processing system which is able to present information of high interest including a stereoscopic image as information of a search result.

A further object of the present embodiment is to provide an information processing apparatus, storage medium, information processing method and information processing system which is able to reduce a processing load as much as possible.

A first embodiment is an information processing apparatus comprising a displayer, a plurality of imagers, a display controller, an index image displayer, an index image selector, a first reducer, a judger, a second reducer, a calculator, a candidate presenter, and an information presenter. The displayer allows a stereoscopic display. The plurality of imagers are provided to be flush with each other. Accordingly, the plurality of imagers simultaneously image the same object to be imaged. The display controller displays a through image imaged by the plurality of imagers on the displayer. Here, out of the plurality of imagers, a through image imaged by any one of the imager may be displayed. An index image displayer displays a predetermined index image being an index for imaging while being superimposed on the through image. An index image selector allows a selection of the predetermined index image corresponding to a first feature of a configuration of an object to be imaged. A first reducer reduces the number of a plurality of search targets which is previously contained on the basis of the first feature of the configuration of the object to be imaged corresponding to the predetermined index image selected by the index image selector when imaging processing is executed by the plurality of imagers. A judger judges a size of the object to be imaged on the basis of the imaged image imaged by the plurality of imagers. A second reducer further reduces the number of the plurality of search targets which has been reduced by the first reducer on the basis of a second feature of a shape of the object to be imaged which is judged based on the imaged image. A calculator calculates a similarity level between the object to be imaged and each of the search targets which is reduced in number by the second reducer on the basis of the size of the object to be imaged and the feature of the imaged image. A candidate presenter presents the search targets of a high similarity level calculated by the calculator as candidates.

According to the first embodiment, the number of search targets is reduced on the basis of the feature of the shape of the object to be imaged, and therefore, a load of the similarity level calculating processing can be lessen, preventing the waste of time.

A second embodiment is according to the first embodiment, and the information processing apparatus further comprises a condition selector and a deleter. The condition selector allows a selection of a predetermined condition as to the object to be imaged. The deleter deletes the search targets which do not match the predetermined condition selected by the condition selector from the candidates. The candidate presenter presents the search targets as candidates which are not deleted by the deleter.

According to the second embodiment, the candidates for the search targets which do not match the predetermined condition are deleted, and therefore, one search target can be selected from the candidates which are narrowed down at a certain degree, capable of relatively easily selecting a desired search target.

A third embodiment is according to the first embodiment, wherein the feature of the imaged image is color information.

According to the third embodiment, it is possible to present the search targets as candidates on the basis of the color of the object to be imaged.

A fourth embodiment is according to the first embodiment, wherein the feature of the imaged image is information in relation to a shape of an object.

According to the fourth embodiment, it is possible to present the search targets as candidates on the basis of the shape of the object to be imaged.

A fifth embodiment is according to the first embodiment, wherein the judger includes a distance calculator which detects a parallax between the two imagers, and calculates a distance to the object to be imaged from a distance corresponding to the parallax and a set distance between the two imagers, and a size calculator which calculates a size of the object to be imaged from the distance to the object to be imaged calculated by the distance calculator and an angle of view of the imagers.

According to the fifth embodiment, on the basis of the parallax between the two imagers and the set distance between them, the distance to the object to be imaged is calculated, and on the basis of the calculated distance, the size is further calculated, and therefore, it is possible to easily calculate the size of the object to be imaged.

A sixth embodiment is according to the first embodiment, wherein the information processing apparatus further comprises a similarity level increaser. The similarity level increaser increases the similarity level when the degree of view of the object to be imaged is high, that is when the frequency of view (encounter) is high.

According to the sixth embodiment, because the similarity level is made high in a case that the object to be imaged is often encountered, in a case that candidates for the object to be imaged are presented in the descending order of the similarity level, the candidates for the object to be imaged which are often encountered can be presented at higher ranking.

A seventh embodiment is according to the first embodiment, further comprising an information presenter which presents information including a stereoscopic image relating to the selected search target out of the search targets as candidates presented by the candidate presenter, by means of the displayer.

According to the seventh embodiment, the information including the stereoscopic image is presented, and therefore, it is possible to present information of high interest. Specifically, the user can view the information of the object while imaging the object, and therefore, the user can compare the real object with the stereoscopic image, and enjoy the search result.

An eighth embodiment is according to the first embodiment, wherein the display controller includes a color acquirer and a color setter. The color acquirer acquires a color of the through image. The color setter sets a color of the predetermined index image to a color different from the color of the through image. For example, they are displayed in different colors or at different levels of the brightness.

According to the eighth embodiment, different colors are set to the through image and the predetermined index image, and therefore, it is easily distinguish the object to be imaged from the index image. Thus, simple imaging is realized.

A ninth embodiment is according to the eighth embodiment, wherein the color setter sets the color of the predetermined index image to a complementary color of the color of the through image.

According to the ninth embodiment, the color of the predetermined index image is set to the complementary color of the color of the through image, and therefore, it is easily distinguish the object to be imaged from the index image.

A tenth embodiment is according to the eighth embodiment, wherein the color acquirer acquires the color of the through image at a position where the predetermined index image is arranged.

According to the tenth embodiment, the color in the position where the predetermined index image is arranged is acquired from the through image, and the index image is set to a color different from the acquired color, and therefore, it is possible to surely distinguish the through image from the index image.

An eleventh embodiment is according to the eighth embodiment, wherein the predetermined index image is an frame-shaped line image for causing at least the size of the object to be imaged to conform to a predetermined size.

According to the eleventh embodiment, the object to be imaged is conformed to the predetermined size, and therefore, it is possible to calculate the size of the object to be imaged from the imaged image. Furthermore, the predetermined index image is a frame-shaped line image, and this eliminates the disadvantage of difficulty in viewing the through image. That is, the index image does not hinder imaging.

A twelfth embodiment is a storage medium storing an information processing program of an information processing apparatus having a displayer which allows a stereoscopic display, and a plurality of imagers which are provided to be flush with each other, the information processing program causes a computer of the information processing apparatus to function as: a display controller which displays a through image imaged by the plurality of imagers on the displayer; an index image displayer which displays a predetermined index image being an index for imaging while being superimposed on the through image; an index image selector which allows a selection of the predetermined index image corresponding to a first feature of a configuration of an object to be imaged; a first reducer which reduces the number of a plurality of search targets which is previously contained on the basis of the first feature of the configuration of the object to be imaged corresponding to the predetermined index image selected by the index image selector when imaging processing is executed by the plurality of imagers; a judger which judges a size of the object to be imaged on the basis of the imaged image imaged by the plurality of imagers; a second reducer which further reduces the number of the plurality of search targets which has been reduced by the first reducer on the basis of a second feature of a shape of the object to be imaged which is judged based on the imaged image; a calculator which calculates a similarity level between the object to be imaged and each of the search targets which is reduced in number by the second reducer on the basis of the size of the object to be imaged and the feature of the imaged image; and a candidate presenter which presents the search targets of a high similarity level calculated by the calculator as candidates.

A thirteenth embodiment is an information processing method of an information processing apparatus having a displayer which allows a stereoscopic display, and a plurality of imagers which are provided to be flush with each other, a computer of the information processing apparatus comprising: (a) displaying a through image imaged by the plurality of imagers on the displayer; (b) displaying a predetermined index image being an index for imaging while being superimposed on the through image; (c) allowing a selection of the predetermined index image corresponding to a first feature of a configuration of an object to be imaged; (d) reducing the number of a plurality of search targets which is previously contained on the basis of the first feature of the configuration of the object to be imaged corresponding to the predetermined index image selected by the step (c) when imaging processing is executed by the plurality of imagers; (e) judging a size of the object to be imaged on the basis of the imaged image imaged by the plurality of imagers; (f) further reducing the number of the plurality of search targets which has been reduced by the first reducer on the basis of a second feature of a shape of the object to be imaged which is judged based on the imaged image; (g) calculating a similarity level between the object to be imaged and each of the search targets which is reduced in number by the step (f) on the basis of the size of the object to be imaged and the feature of the imaged image; and (h) presenting the search targets of a high similarity level calculated by the step (g) as candidates.

A fourteenth embodiment is an information processing system comprising a displayer, a plurality of imagers, a display controller, an index image displayer, an index image selector, a first reducer, a judger, a second reducer, a calculator, a candidate presenter, and an information presenter. The displayer allows a stereoscopic display. The plurality of imagers are provided to be flush with each other. Accordingly, the plurality of imagers simultaneously image the same object to be imaged. The display controller displays a through image imaged by the plurality of imagers on the displayer. Here, out of the plurality of imagers, a through image imaged by any one imager may be displayed. An index image displayer displays a predetermined index image being an index for imaging while being superimposed on the through image. An index image selector allows a selection of the predetermined index image corresponding to a first feature of a configuration of an object to be imaged. A first reducer reduces the number of a plurality of search targets which is previously contained on the basis of the first feature of the configuration of the object to be imaged corresponding to the predetermined index image selected by the index image selector when imaging processing is executed by the plurality of imagers. A judger judges a size of the object to be imaged on the basis of the imaged image imaged by the plurality of imagers. A second reducer further reduces the number of the plurality of search targets which has been reduced by the first reducer on the basis of a second feature of a shape of the object to be imaged which is judged based on the imaged image. A calculator calculates a similarity level between the object to be imaged and each of the search targets which is reduced in number by the second reducer on the basis of the size of the object to be imaged and the feature of the imaged image. A candidate presenter presents the search targets of a high similarity level calculated by the calculator as candidates.

In the twelfth to fourteenth embodiments as well, it is possible to lessen the load of the similarity level calculating processing similar to the first embodiment.

The above described objects and other objects, features, aspects and advantages of the present embodiment will become more apparent from the following detailed description of the present embodiment when taken in conjunction with the accompanying drawings.

BRIEF DESCRIPTION OF THE DRAWINGS

FIG. 2(A) shows an example non-limiting top surface in a closed state, FIG. 2(B) shows an example non-limiting left side surface in the closed state, FIG. 2(C) shows an example non-limiting front surface in the closed state, FIG. 2(D) shows an example non-limiting right side surface in the closed state, FIG. 2(E) shows an example non-limiting back surface in the closed state, and FIG. 2(F) shows an example non-limiting bottom surface in the closed state;

FIG. 6 shows an example non-limiting principle of 3D/2D display in a parallax barrier method, FIG. 6(A) shows an example non-limiting state that a parallax barrier is turned on (3D display), and FIG. 6(B) shows an example non-limiting state that a parallax barrier is turned off (2D display);

FIG. 9 shows another example non-limiting the designation image to be displayed on the imaging screen displayed on the stereoscopic LCD and the lower LCD of the game apparatus shown in FIG. 1;

FIG. 10 shows a still another example non-limiting the designation image to be displayed on the imaging screen displayed on the stereoscopic LCD and the lower LCD of the game apparatus shown in FIG. 1;

FIG. 19 shows an example non-limiting overview of data for search;

FIG. 20 shows an example non-limiting method of extracting color information of a flower from an image;

FIG. 21 shows an example non-limiting method of extracting shape information of a flower from an image;

DETAILED DESCRIPTION OF NON-LIMITING EXAMPLE EMBODIMENTS

Figure 1:
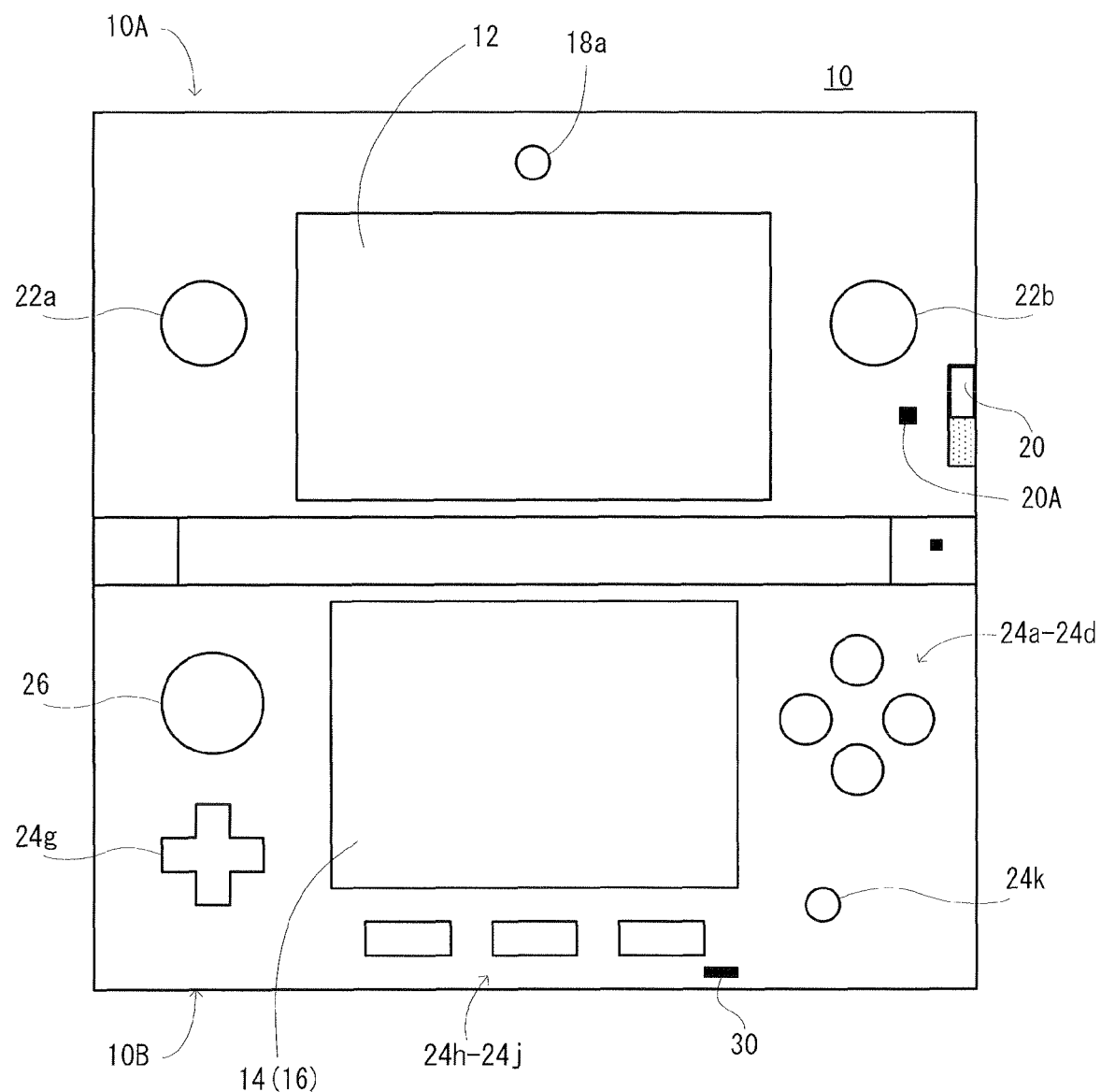
FIG. 1 shows an example non-limiting game apparatus of the present embodiment, and shows a front surface in an opened state.
Figure 2:
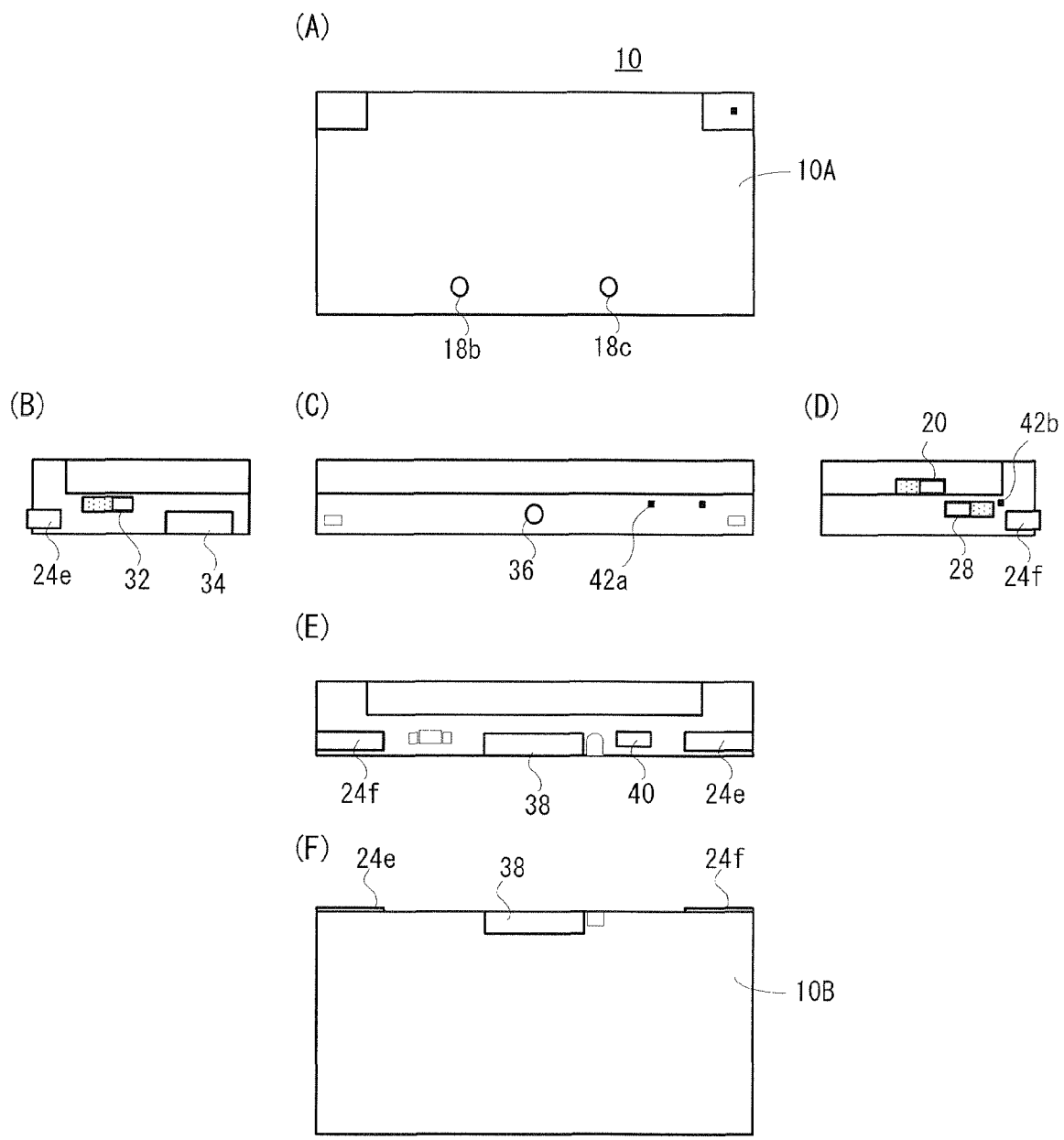
FIG. 2 shows an example non-limiting game apparatus.

FIG. 1 and FIG. 2 show an example non-limiting appearance of the game apparatus 10. The game apparatus 10 is a foldable game apparatus, FIG. 1 shows a front of the game apparatus 10 in an opened state, and FIG. 2(A) to FIG. 2(F) respectively show a top surface, a left side surface, a front surface, a right side surface, a back surface and a bottom surface of the game apparatus 10 in a closed state.

The game apparatus 10 has an upper housing 10A and a lower housing 10B rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc.

are provided. On a top surface of the lower housing 10B, a lower LCD 14 attached with touch panel 16, A, B, X, Y buttons 24a-24d, a cross key (button) 24g, home, select, start buttons 24h-24j, a power button 24k, an analog pad 26, and a rophone 30 are provided.

Furthermore, as shown in FIG. 2(A), on the top surface of the game apparatus 10 (underside of the upper housing 10A shown in FIG. 1), right and left outward cameras 18b and 18c compliant with 3D imaging are provided. Furthermore, as shown in FIG. 2(C), on the front surface of the game apparatus 10, a headphone terminal 36, a power lamp 42a, etc. are provided. Also, as shown in FIG. 2(B), FIG. 2(E) and FIG. 2(D), from the left side surface to the back surface of the game apparatus 10, an L button 24e is provided, and from the right side surface to the back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are further provided. The above-described 3D adjusting switch 20 is exposed from the right side surface. In addition, on the back surface of the game apparatus 10, an infrared ray emitting-receiving unit 40, etc. is further provided. Then, as shown in FIG. 2(E) and FIG. 2(F), from the back surface to a bottom surface, a game card slot 38 is provided.

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereoscopic 3D systems may be adopted without being restricted to the parallax barrier system.

The inward camera 18a images a planar image (2D image) while the outward cameras 18b and 18c image stereoscopic images (3D image). A 2D or 3D image imaging a player can be used as an image input to an application program such as a game program. In this case, the game program detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

Figure 3:
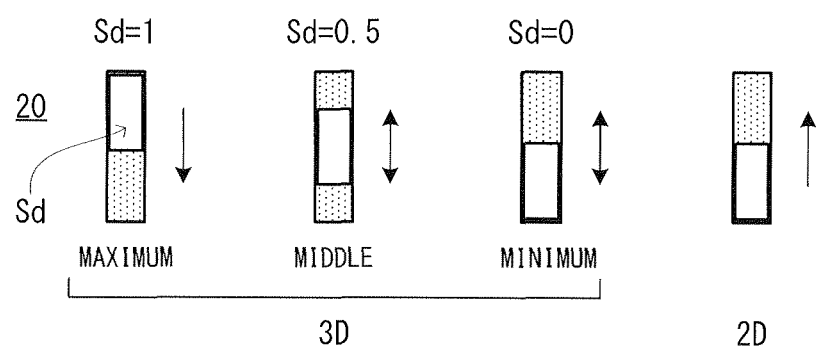
FIG. 3 shows an example non-limiting operation of a 3D adjusting switch.

The 3D adjusting switch 20 is a slide switch for manually switching, as to the display of the stereoscopic LCD 12, between the 3D display and the 2D display, and manually adjusting a three-dimensional effect in the 3D display as well, and is operated as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved to the lower end.

Although the detailed description is omitted, such a change of the three-dimensional effect of the 3D display is implemented by changing the distance (distance-between cameras D) between the right and left virtual cameras (not shown) arranged within the virtual space. That is, according to an operation of the 3D adjusting switch 20, the distance-between cameras D is adjusted. Then, the distance-between cameras D undergoes an automatic adjustment by the game program as well as such a manual adjustment.

The 3D lamp 20A is a lamp showing a displaying condition of the stereoscopic LCD 12, and lights up in the 3D display and lights off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a-24d, the cross key (button) 24g, the home, select, start buttons 24h-24j, or the analog pad 26 is used as a touch/button/pad input to the game program. The power button 24k is used for turning on or off the power of the game apparatus 10. The power lamp 42a lights up or off in conjunction with the power-on or the power-off of the power source.

The microphone 30 converts a speech voice by a player, an environmental sound, etc. into sound data. The sound data can be used as a sound input to the game program. In this case, the game program detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game voice, a microphone voice, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for saving a camera image, a microphone sound, etc., and the game card slot 38 is attached with a game card (not illustrated) storing the game program, etc. The infrared ray emitting-receiving unit 40 is utilized for infrared rays (IR) communications with other game apparatuses.

Figure 4:
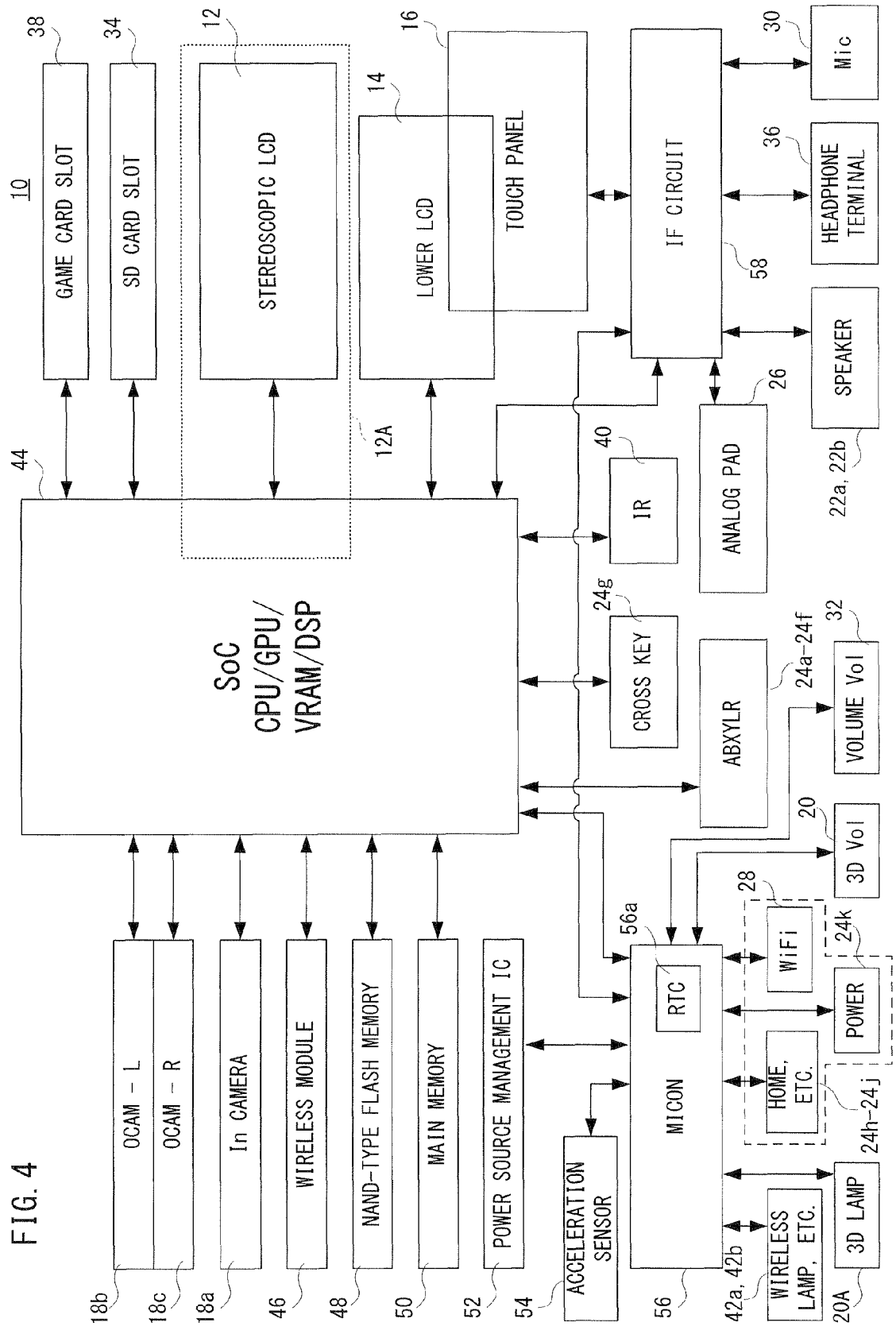
FIG. 4 shows an example non-limiting electric configuration of the game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving unit (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. Thus, although illustration is omitted, the game apparatus 10 can communicate with other game apparatuses and computers directly or via a network. The NAND-type flash memory 48 stores data to be saved, such as a camera image, a microphone voice, etc. The main memory 50 gives a working area to the SoC 44. That is, in the main memory 50, various data and programs to be used in the application such as a game are stored, and the SoC 44 performs works by utilizing the data and program stored in the main memory 50.

The microcomputer 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result by the acceleration sensor 54 is available as a motion input to the game program. In this case, the game program calculates the movement of the game apparatus 10 itself on the basis of the detection result, and execute processing according to the calculation result. Also, the microcomputer 56 includes an RTC (real-time clock) 56a, and counts a time by the RTC 56a to supply it to the SoC 44.

Figure 5:
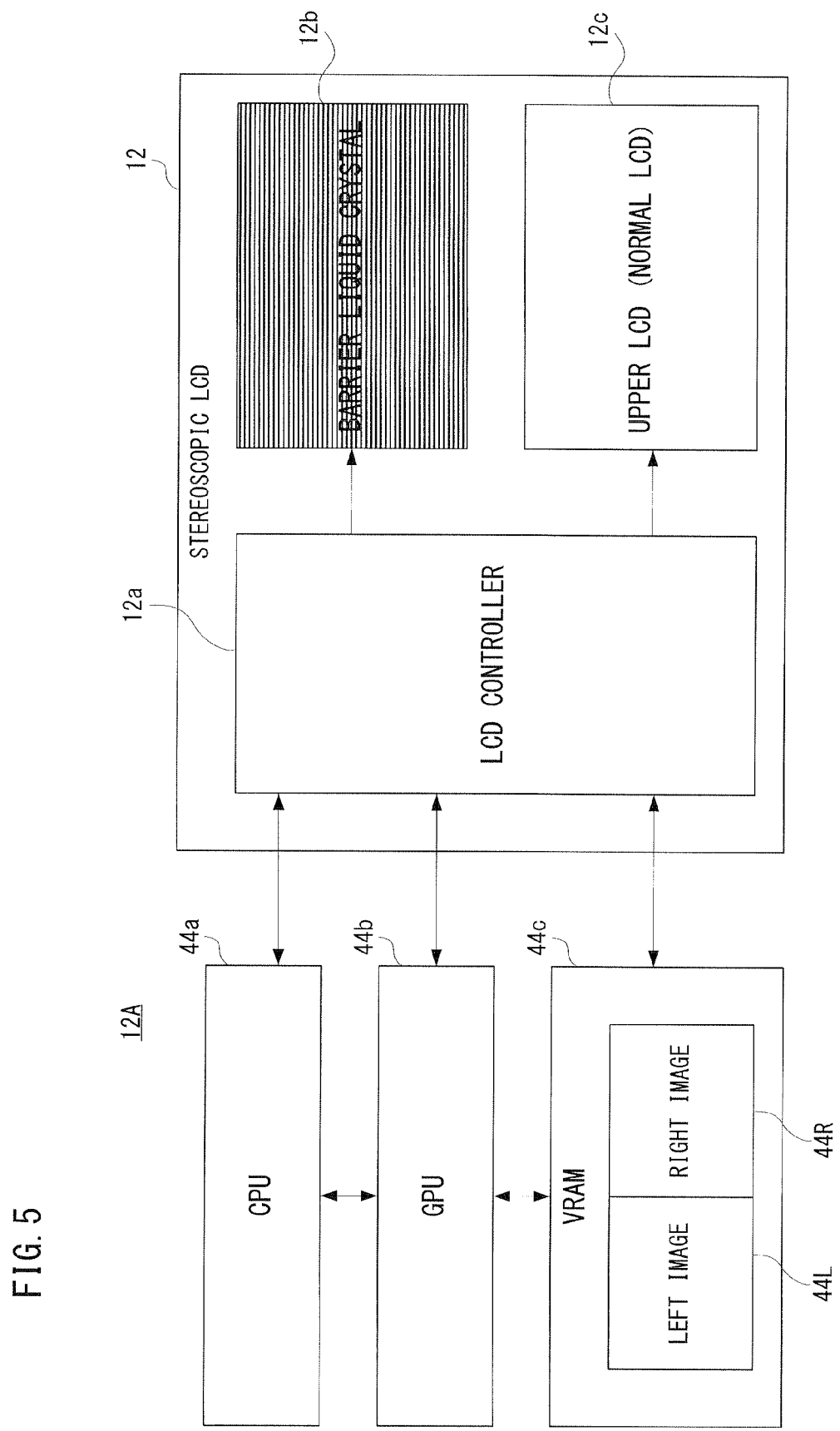
FIG. 5 shows an example non-limiting an important part (stereoscopic LCD controller being made up of a stereoscopic LCD and a part of SoC) of an electric configuration in FIG. 4.

FIG. 5 shows a stereoscopic LCD controller 12A being made up of the stereoscopic LCD 12 and a part of the SoC 44. The stereoscopic LCD 12 includes an LCD controller 12a, a barrier liquid crystal 12b and an upper LCD 12c. The barrier liquid crystal 12b includes a plurality of liquid crystal slits extending in a vertical (row) direction as shown in FIG. 6(A), and makes the right eye and the left eye view beams passing through pixels in a different row of the upper LCD 12c by alternately cutting off the beam from the backlight by the plurality of liquid crystal slits. The upper LCD 12c may be a general liquid crystal (for 2D display) similar to the lower LCD 14. The LCD controller 12a performs drawing on the upper LCD 12c under the control of the GPU 44b and then the CPU 44a, and turns the barrier liquid crystal 12b (applied voltage thereto) on and off. When the barrier liquid crystal 12b is turned off, the right eye and the left eye can view the beams passing through the pixels of all the rows on the upper LCD 12c as shown in FIG. 6(B).

Here, FIG. 5 shows that the LCD controller 12a, the GPU 44b and the VRAM 44c are provided by bringing them into correspondence with the stereoscopic LCD 12, and naturally, the LCD controller, the GPU and the VRAM are also provided bringing them into correspondence with the lower LCD 14. As can be understood from FIG. 5, the GPU corresponding to the lower LCD 14 is also connected to the CPU 44a so as to be able to transmit and receive signals, and the GPU corresponding to the lower LCD 14 and the VRAM are connected with each other so as to be able to transmit and receive signals. Then, the CPU 44a, the GPU corresponding to the lower LCD 14 and the VRAM each is connected to the LCD controller corresponding to the lower LCD 14 so as to be able to transmit and receive signal, so that the lower LCD 14 is connected to this LCD controller.

For example, when the power button 24k is turned on to turn the power source of the game apparatus 10 on, the game apparatus 10 is started up to display a main menu screen not shown on the lower LCD 14. On the main menu screen, execution of an application, such as a virtual game, that can be executed with the game apparatus 10 can be instructed. Also, depending on the kind of the virtual game, by making communications with two or more game apparatuses 10, a virtual game (communication game) can be played.

Figure 7:
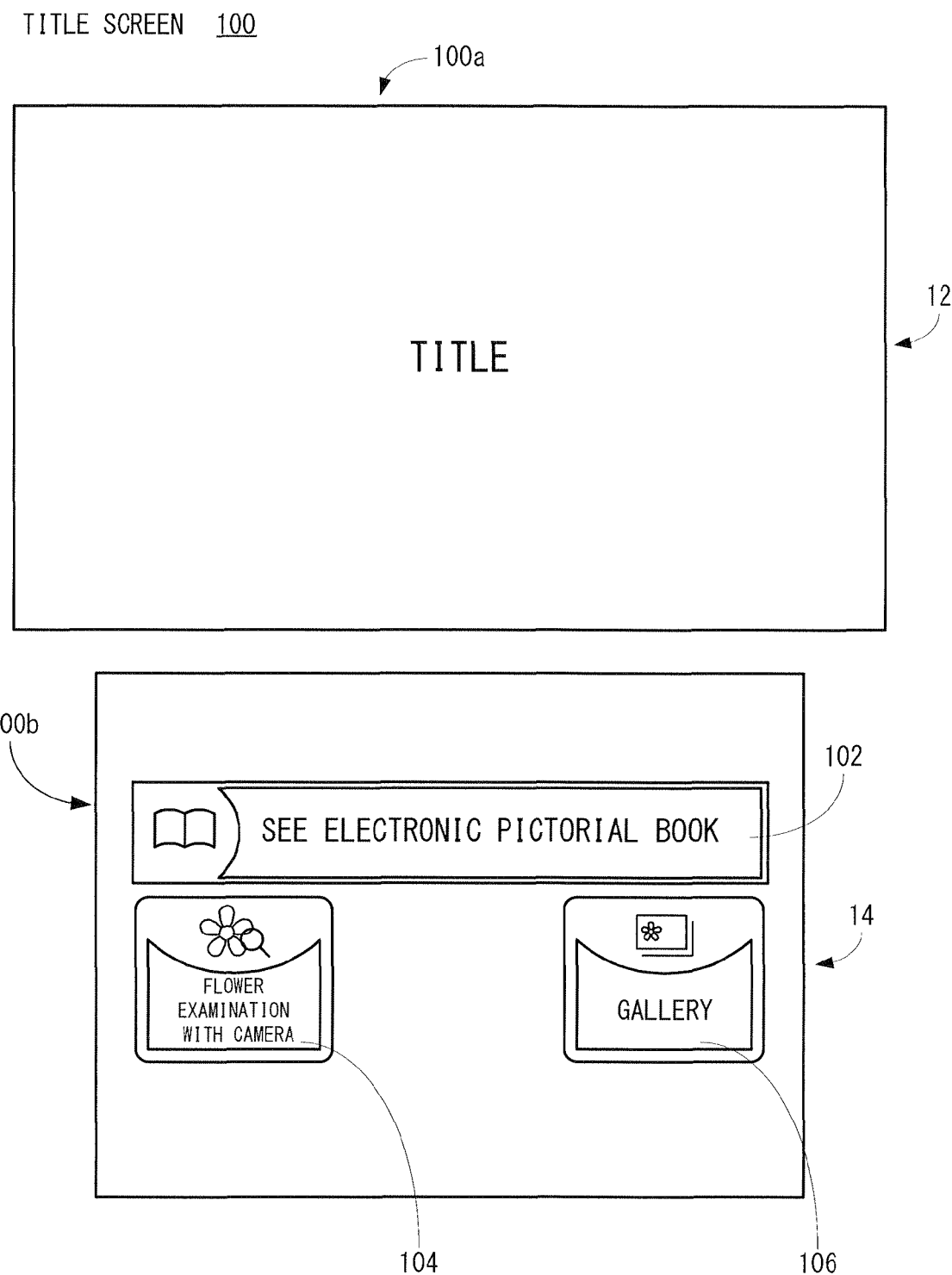
FIG. 7 shows an example non-limiting title screen displayed on a lower LCD of the game apparatus shown in FIG. 1.

FIG. 7 is an illustrative view showing one example of a title screen 100 of an application to be executed in the aforementioned game apparatus 10 of this embodiment. For example, this application is for examining an object (flower in this embodiment) imaged by using an imaging function of the game apparatus 10 in an electronic pictorial book, seeing the examined result, and further viewing the imaged image of the flower at a virtual gallery.

As shown in FIG. 7, the title screen 100 includes an upper screen 100a and a lower screen 100b. The upper screen 100a is displayed on the stereoscopic LCD 12, and the lower screen 100b is displayed on the lower LCD 14. This holds true for each screen shown below. On the upper screen 100a, the title of this application is displayed in characters (text, etc.) Although the illustration is omitted, on the upper screen 100a, a background image is also displayed.

Furthermore, on the lower screen 100b, a button image 102, a button image 104 and a button image 106 for selecting a menu executable in this application are displayed. The button image 102 is provided for seeing the electronic pictorial book. The button image 104 is provided for examining a flower imaged by the cameras (18b, 18c) (hereinafter, sometimes referred to as "flower examination with camera"). The button image 106 is provided for viewing an image of a flower imaged by the user in the virtual gallery.

It should be noted that selecting and executing a pictorial book function and a galley function on the title screen 100 are not essential matters of this embodiment, and thus, the detailed description thereof is omitted.

Figure 8:
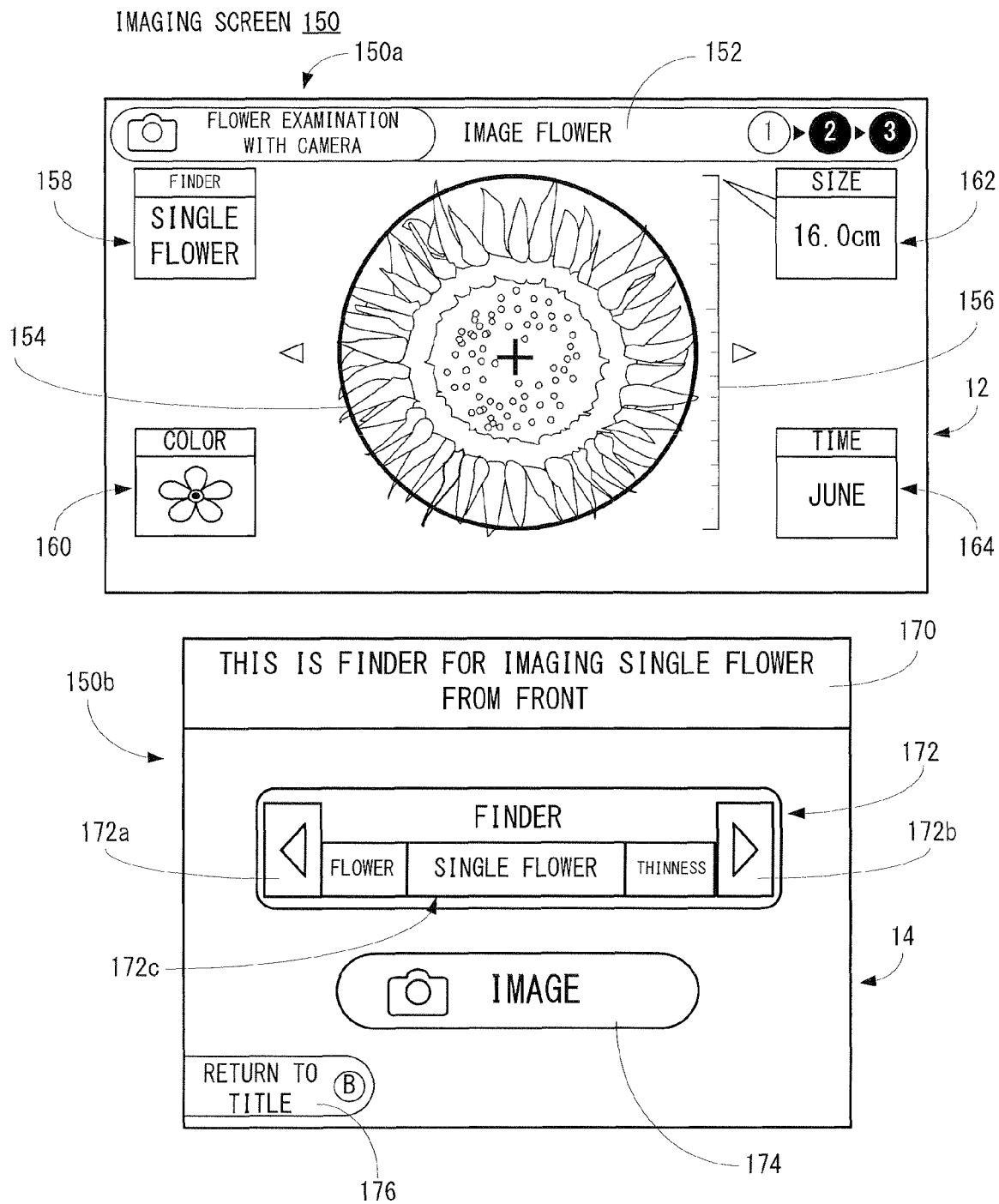
FIG. 8 shows an example non-limiting imaging screen displayed on the stereoscopic LCD and the lower LCD of the game apparatus shown in FIG. 1.

For example, when the button image 104 is turned on (touched) on the title screen 100, a flower examining function with camera is executed (started) to display an imaging screen 150 as shown in FIG. 8 on the stereoscopic LCD 12 and the lower LCD 14. Here, when the imaging screen 150 is first displayed, a single flower finder described later is selected. Although the detailed description is omitted, when the flower examining function with camera is started, an imaging mode is set to activate outward cameras 18b, 18c.

The imaging screen 150 includes an upper screen 150a and a lower screen 150b. On the upper screen 150a, a display region 152 is provided at the upper end thereof, and below the display region 152, a circular (round frame) designation image 154 is displayed in the center of the upper screen 150a, and a scale image 156 is displayed on the right of the designation image 154. Furthermore, on the upper screen 150a, on the left of the designation image 154, a display region 158 and a display region 160 are provided, and on the right of the scale image 156, a display region 162 and a display region 164 are provided. The upper screen 150a on which the designation image 154 shown in FIG. 8 is displayed is called "single flower finder". The single flower finder is used for imaging a single flower having a diameter of 2 cm or more, or flowers which thinly bloom.

On the rearmost surface of the upper screen 150a, a through image of an image imaged by the outward cameras 18b, 18c is displayed. That is, the upper screen 150a functions as a viewfinder. Furthermore, the through image and the designation image 154 are superimposed on each other, and the designation image 154 is displayed in front of the through image. In the display region 152, that the flower examining function with camera is being executed, imaging is now being made and the progress status of the function are indicated in characters, or the like. The designation image 154 is an index for imaging an object to be imaged in an appropriate size and in an appropriate position in imaging. This is because that the size of the flower, the color of the flower, the shape of the flower, etc. are calculated on the basis of the imaged image. Accordingly, in this embodiment, a flower is imaged to be in alignment with the frame (round frame in FIG. 8) of the designation image 154. Due to this, the position and size of the circle of the designation image 154 are fixed at a predetermined position and a predetermined size. The scale image 156 indicates the size of the flower to be calculated in a case that a flower is imaged to be in alignment with the designation image 154, together with a numerical value displayed in the display region 162 described later. The scale image 156 is fixed at a predetermined length similar to the designation image 154.

Here, although it is difficult to view in the drawing, the designation image 154 is displayed in a complementary color of the color of the background acquired from the through image. At this time, a color of one point or colors of a plurality of points where the frame of the designation image 154 is displayed are acquired from the through image, and a complementary color of the color is selected. Here, in a case that colors of a plurality of points are acquired, a complementary color of the averaged color of the acquired colors is selected. This is because easy discrimination of the designation image 154 from the background image (through image) is made to thereby cause a flower to be easily in alignment with the designation image 154.

In this embodiment, the designation image 154 is displayed in the complementary color of the color acquired from the through image, but there is no need of being restricted thereto. For example, by a difference in color values and luminance values by a predetermined value or more, easy discrimination between the through image and the designation image 154 may be performed.

Here, changes of the color, etc. of the designation image depending on the color of the through image (background) is true for the designation image displayed in other finders described later.

In the display region 158, the kind of the finder is displayed. In this embodiment, five kinds of finders are prepared, and one finder is selected by the user as described later. Accordingly, in the display region 158, the kind of the selected finder is displayed. Furthermore, in the display region 160, the color of the flower which is being imaged (through image) is displayed. For example, in the display region 160, an image of the flower to which the color of the flower which is being imaged is applied is displayed. In the display region 162, the size of the flower is displayed. Here, the size of the flower is calculated assuming that the flower is imaged in such a size to conform to the designation image 154. Then, in the display region 164, an imaging time is displayed. In this embodiment, from the date and time, the month of imaging is displayed as an imaging time.

Although illustration is omitted, on the imaging screen 150, a message indicating that the flower should be imaged to be in alignment with the frame of the designation image 154 may be displayed below the designation image 154 and the display regions 160, 164.

On the lower screen 150*b*, at the upper end thereof, a display region 170 is provided. Below the display region 170, a display region 172 and a button image 174 are provided to be vertically arranged in the center of the screen. Furthermore, at the lower left of the lower screen 150*b*, a button image 176 is provided.

In the display region 170, a simple explanatory text as to a finder which is currently being selected is displayed. In the display region 172, a button image 172*a* and a button image 172*b* are further provided, and a display region 172*c* is provided in between them.

The button image 172*a* and the button image 172*b* are provided for selecting a finder, and in response to the button image 172*a* or the button image 172*b* being turned on (touched), the display content of the display region 172*c* moves right and left to thereby change the kind of the finder to be displayed. Here, instead of the button image 172*a* or the button image 172*b* being touched, the left push button or the right push button of the cross key 24*g* or the analog pad 26 may be operated.

Hereafter, in a case that the design of the operating switch or the key is similarly displayed in the button image, by operating the operating switch or the key represented by the design, an instruction the same as that when the button image is turned on (touched) is input. This is not the essential content of this embodiment, and the explanation thereof will be omitted in the following description.

In this embodiment, the single flower finder, a group finder, a slim finder, a downward finder and a small flower finder are prepared. When the finder is changed, at least any one of the shape and the size of the designation image displayed on the upper screen 150*a* is changed. Also, the display position and the size of the scale image may be changed.

In FIG. 9 and FIG. 10, examples of designation images and scale images when other finders are selected. Displaying all the designation images and the scale images in a fixed size and length is similar to the designation image 154 and the scale image 156.

In FIG. 9(A), a designation image 180 and the scale image 156 in a case that the group finder is selected. The group finder is used for imaging a cluster of flowers (thickly bloom). The designation image 180 is of approximately the same size as the designation image 154 shown in FIG. 8, and represented by a frame (round frame) in the shape of a circle depicted in the wavy line. Similar to the single flower finder, the scale image 156 is displayed on the right of the designation image 180.

In FIG. 9(B), a designation image 182 and the scale image 156 in a case that the slim finder is selected is displayed. The slim finder is used for imaging flowers blooming in long clusters from the side. The designation image 182 is represented by a frame in the shape of vertically-long track depicted in a wavy line. The designation image 182 is of approximately the same length as the designation image 154 shown in FIG. 8, but is of width half the length.

In FIG. 10(A), a designation image 184 and the scale image 156 in a case that the downward finder is selected is displayed. The downward finder is used for imaging the flower blooming downwardly from the side. The designation image 184 is represented by a bell-shaped frame. Here, for easy understanding of the downward finder, the designation image 184 is shown by the bell-shaped frame, but is of approximately the same size as the single flower finder. Here, the scale image 156 shown in FIG. 10(A) is displayed above the designation image 184.

In FIG. 10(B), a designation image 186 and a scale image 190 in a case that the small flower finder is selected is displayed. The small flower finder is used for imaging a small flower having a diameter being less than 2 cm from the front. The designation image 186 is a frame (round frame) in the shape of a circle having a diameter half the diameter (radius) of the designation image 154. Also, the scale image 190 has a length half the length of the scale image 156.

In this embodiment, each of the designation images 154, 180, 182, 184, 186 is represented by a line image in the shape of the frame, and therefore, even if the designate image is displayed in front of the through image, it hardly hides the through image, and does not disturb the imaging. It should be noted that in place of the line image in the shape of the frame, a template (mask image) cut out in the same shape as the designation image may be displayed on the entire or a part of the upper screen 150*a*. In such a case, by giving predetermined color to the template or making it translucent, for example, the entire or a part of the background of the through image is masked, or is translucently displayed. Thus, the user can perform imaging while easily aligning the flower as an object to be imaged with the frame. Here, the predetermined color applied to the template and the color of the blur when the template is made translucent are displayed in color (complementary color) different from those of the through image similar to the designation images 154, 180, 182, 184, 186 in this embodiment. For example, the color of the through image at one point or at a plurality of points on the border of the cut-out portion of the template is acquired. Accordingly, it is easy to view the object to be imaged.

Returning to FIG. 8, the button image 174 is provided for imaging. That is, the button image 174 corresponds to a shutter button. When the button image 174 is turned on (touched), imaging processing is executed by the outward cameras 18*b*, 18*c*, and a still image at that time is captured as an imaging image. Accordingly, the imaged image as to the same object (subject) is simultaneously obtained by the outward cameras 18*b*, 18*c*. Here, in a case that the A button 24*a*, the L button 24*e* or the R button 24*f* is operated as well instead of a touch of the button image 174, an imaging instruction is applied to thereby execute the imaging processing.

The button image 176 is provided for returning to the title. When the button image 176 is turned on (touched), the imaging processing is suspended, and the process returns to the title screen 100 shown in FIG. 7.

Furthermore, in FIG. 8, when the button image 174 is turned on to execute the imaging processing by the cameras 18*b*, 18*c*, the data for search described later (see FIG. 19) is filtered in correspondence with the configuration of the flower (how the flower blooms, the size of the flower and the direction of the flower in this embodiment) decided by the finder which is being selected at this time. That is, the data for search having the configuration of the different flowers is deleted from the search target to thereby reduce the data for search as a search target. This is because execution of score calculating processing described later, etc. on all the data for search makes the processing load high and is time-wasting. Moreover, this is for heightening accuracy of the search.

Figure 11:
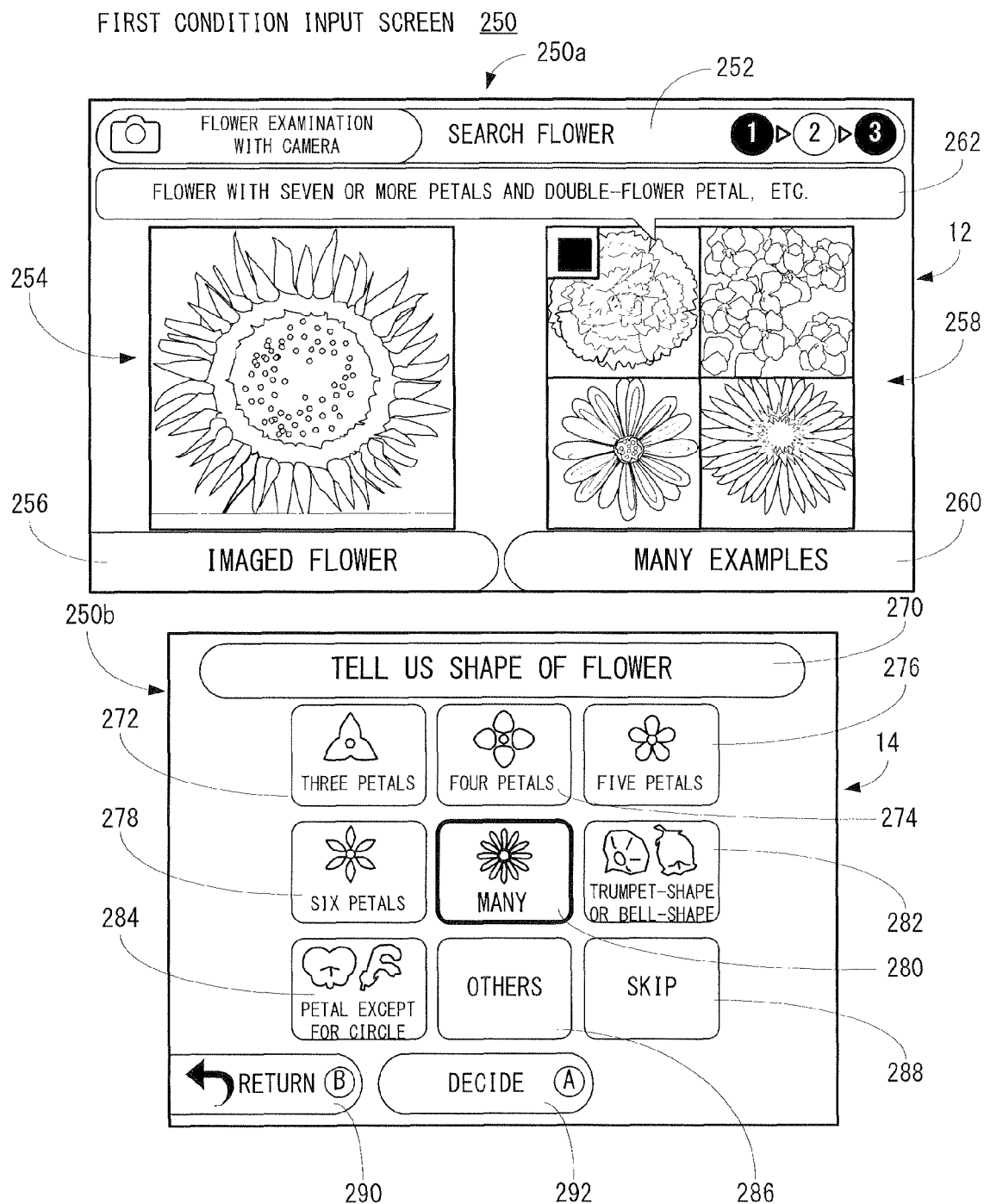
FIG. 11 shows an example non-limiting a first condition input screen displayed on the stereoscopic LCD and the lower LCD of the game apparatus shown in FIG. 1.

Furthermore, when imaging processing is executed to capture the imaged image, a first condition input screen 250 shown in FIG. 11 is displayed on the stereoscopic LCD 12 and the lower LCD 14. The first condition input screen 250 includes an upper screen 250*a* and a lower screen 250*b*.

On the upper screen 250*a*, a display region 252 is provided at the upper end thereof. Furthermore, a display region 254 is provided on the left of the center of the upper screen 250*a*, and a display region 256 is provided below it. Also, a display region 258 is provided on the right of the center of the upper screen 250*a*, and a display region 260 is provided below it. Then, between the display region 252, and the display region 254 and the display region 258, a display region 262 is provided.

In the display region 252, that the flower-examination-with-camera mode is being executed, this is a screen for searching for a flower, and the progress status of the mode are indicated in characters, or the like. In the display region 254, a current imaged image is displayed. In the display region 256, a message that the image displayed in the display region 254 is an image of the imaged flower is described.

In the display region 258, images showing examples of the shape of the flower are displayed. The images displayed in this display region 258 correspond to any one of button images 272, 274, 276, 278, 280, 282, 284 displayed on the lower screen 250*b* described later. Also, in the display region 260, a content indicating that the images displayed in the display region 258 correspond to which example showing the shape of the flower is displayed in text form. In addition, in the display region 262, an explanation of the image displayed in the display region 258 is displayed in text form.

On the lower screen 250*b*, a display region 270 is provided at the upper part thereof, and below the display region 270, the button images 272, 274, 276, 278, 280, 282, 284, 286, 288, 290, 292 are displayed. The button images 272-284 are provided for selecting the shape of a flower. When any one of the button images 272-284 is selected, images showing examples of the shape of the flower corresponding thereto are displayed in the display region 258.

For example, when the button image 272 is turned on, selecting three petals is made. When any one of the button images 274-278 is turned on, selecting different numbers of petals is made. Furthermore, when the button image 280 is selected, selecting many petals is made. Also, when the button image 282 is turned on, selecting a trumpet-shaped or bell-shaped petal is made. Then, when the button image 284 is turned on, selecting a shape of the flower except for a circle is made. Moreover, when the button image 286 is turned on, selecting a shape other than the shapes selected by the button images 272-284 is made. Then, when the button image 288 is turned on, not selecting (skipping the selection of) the shape of the flower is selected.

It should be noted that on the first condition input screen 250 shown in FIG. 11, that the button image 280 is selected and is being selected is represented by a heavy line of the frame of the button image 280. Here, by making the brightness of the selecting button image high, changing the color of the background of the selecting button image, or by performing color reversal on or graying out the button images which are not being selected, the selecting button image may be shown. This holds true for a case that each of the button images is selected below.

The button image 290 is provided for instructing a return to the previous screen. In this embodiment, when the button image 290 is turned on, the screen returns to the imaging screen 150 shown in FIG. 8. That is, imaging again is selected. At this time, the imaged image that was imaged before is erased. The button image 292 is provided for deciding the content of the selected one of the button images 272-288.

Figure 12:
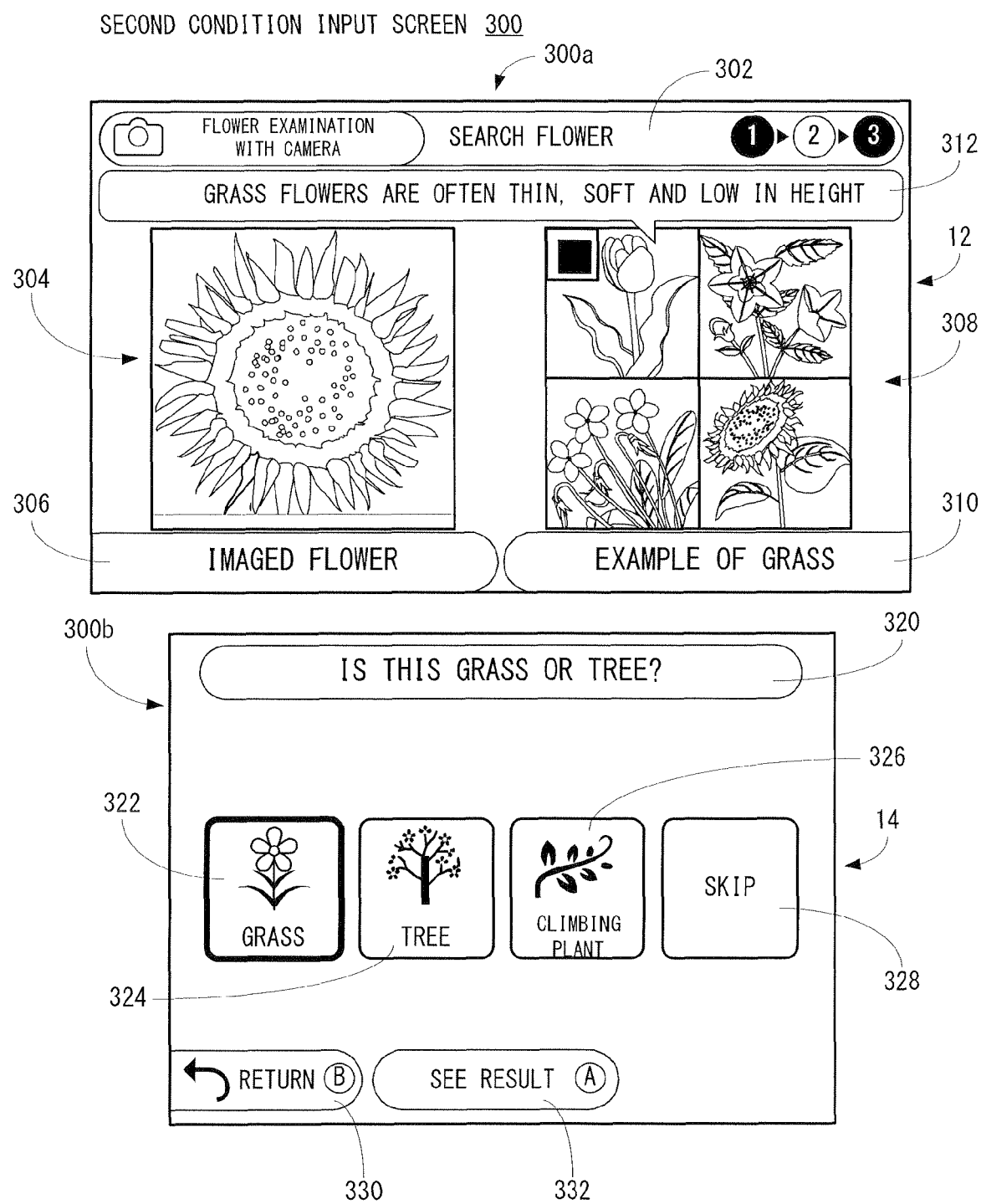
FIG. 12 shows an example non-limiting a second condition input screen displayed on the stereoscopic LCD and the lower LCD of the game apparatus shown in FIG. 1.

When the button image 292 is turned on to decide the content (first condition) assigned to the selected button images 272-282, a second condition input screen 300 as shown in FIG. 12 is displayed on the stereoscopic LCD 12 and the lower LCD 14. The second condition input screen 300 includes an upper screen 300*a* and a lower screen 300*b*.

On the upper screen 300*a*, a display region 302 is provided at the upper part thereof. Furthermore, a display region 304 is provided on the left of the center of the upper screen 300*a*, and a display region 306 is provided below it. Also, a display region 308 is provided on the right of the center of the upper screen 300*a*, and a display region 310 is provided below it. Then, between the display region 302, and the display region 304 and the display region 308, a display region 312 is provided.

In the display region 302, that the flower-examination-with-camera mode is being executed, this is a screen for searching for a flower, and the progress status of the mode are indicated in characters, or the like. In the display region 304, a current imaged image is displayed. In the display region 306, a message that the image displayed in the display region 304 is an image of the imaged flower is described.

In the display region 308, images showing examples of a grass flower, a tree flower or a climbing plant are displayed. The images displayed in this display region 308 correspond to any one of button images 322, 324, 326 displayed on the lower screen 300*b* described later. Furthermore, in the display region 310, a content indicating that the image displayed in the display region 308 is an example of which kind of flowers is described in text form. In addition, in the display region 312, an explanation of the image displayed in the display region 308 is displayed in text form.

On the lower screen 300*b*, a display region 320 is provided at the upper part thereof, and the button images 322, 324, 326, 328, 330, 332 are displayed below the display region 320. The button images 322-326 are provided for respectively selecting the grass flower, the tree flower and the climbing plant. When any one of the button images 322-326 is selected, the aforementioned images corresponding thereto are displayed in the display region 308.

For example, when the button image 322 is turned on, selecting the grass flower is made. When the button image 324 is turned on, selecting the tree flower is made. Then, when the button image 326 is turned on, selecting the climbing plant is made. Moreover, when the button image 328 is turned on, not selecting (skipping the selection of) each of the grass flower, the tree flower, and the climbing plant is selected.

The button image 330 is provided for instructing a return to the previous screen. In this embodiment, when the button image 330 is turned on, the screen returns to the first condition input screen 250 shown in FIG. 11. Furthermore, the button image 332 is provided for deciding the content of the selected button images 322-328.

Figure 13:
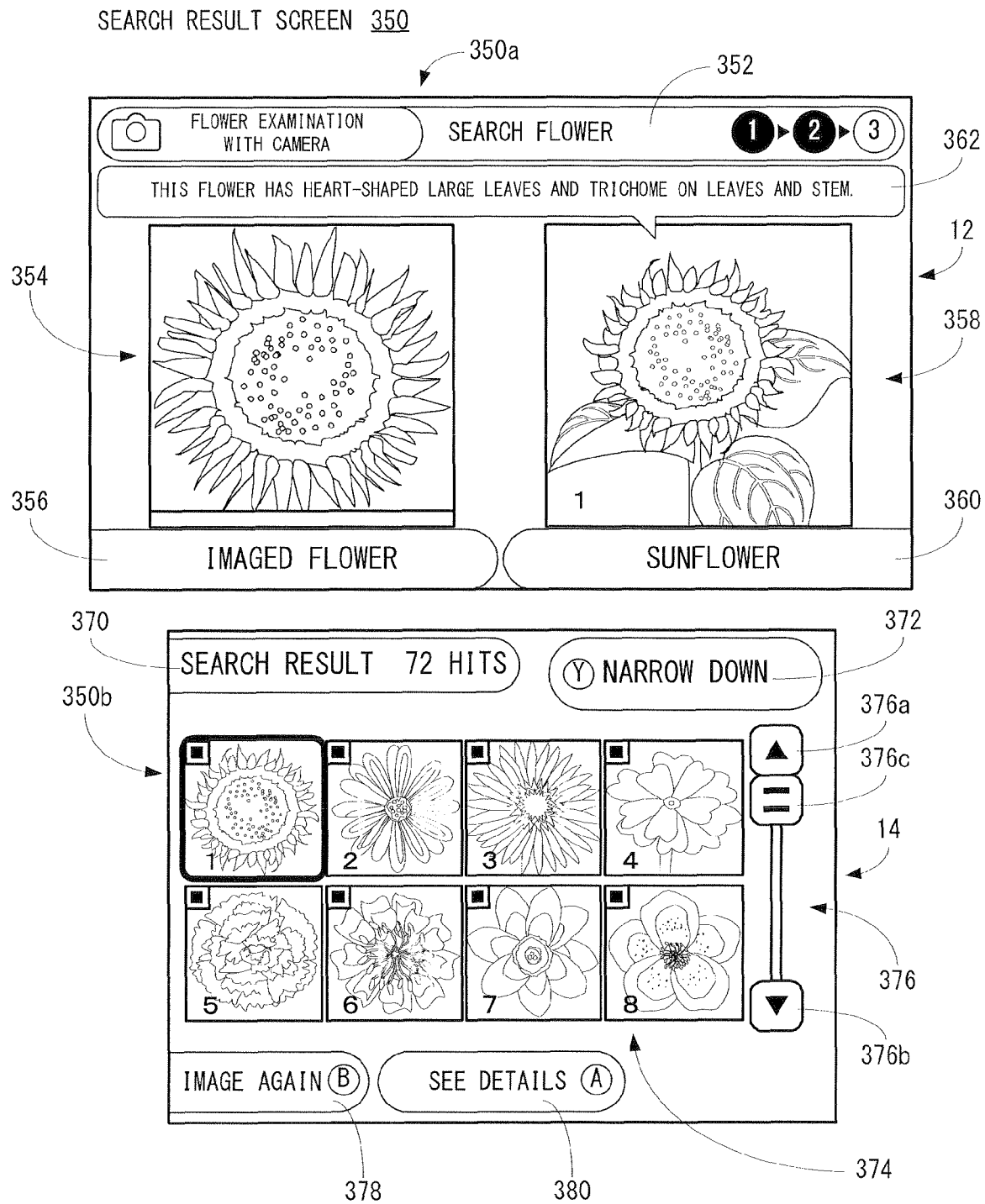
FIG. 13 shows an example non-limiting a search result screen displayed on the stereoscopic LCD and the lower LCD of the game apparatus shown in FIG. 1.

When the button image 332 is turned on to decide the content (second condition) assigned to the selected one of the button images 322-328, a search result screen 350 as shown in FIG. 13 is displayed on the stereoscopic LCD 12 and the lower LCD 14. The search result screen 350 includes an upper screen 350a and a lower screen 350b. Although the search result screen 350 is described below, but contents the same as those in each screen described before are omitted.

As shown in FIG. 13, on the upper screen 350a, a display region 352 is provided at the upper part thereof. Furthermore, a display region 354 is provided at the left of the center of the upper screen 350a, and a display region 356 is provided below it. Also, a display region 358 is provided at the right of the center of the upper screen 350a, and a display region 360 is provided below it. Then, between the display region 352, and the display region 354 and the display region 358, a display region 362 is provided.

In the display region 352, that the flower-examination-with-camera mode is being executed, this is a screen for searching for a flower, and the progress status of the mode are indicated in characters, or the like. In the display region 354, a current imaged image is displayed. In the display region 356, a message that the image displayed in the display region 354 is an image of the imaged flower is described.

In the display region 358, an image of the flower as a search result is displayed. The image displayed in this display region 358 is an image (normal image) of a normal size corresponding to a reduced image displayed in a display region 374 displayed on the lower screen 350b described later. Furthermore, in the display region 360, a name of the flower represented by the normal image displayed in the display region 358 is displayed in text form. In addition, in the display region 362, a simple explanation of the flower represented by the normal image displayed in the display region 358 is displayed in text form.

On the lower screen 350b, at the upper left thereof, a display region 370 is provided, and on the right thereof, a button image 372 is displayed. Furthermore, below the display region 370 and the button image 372, a display region 374 is provided, and on the right of the display region 374, a scroll button image 376 is displayed. In addition, at the lower part of the lower screen 350b, a button image 378 and a button image 380 are displayed.

In the display region 370, the number of candidates as a search result based on the imaged image is displayed. The button image 372 is provided for further narrowing down the candidates from the search result. In the display region 374, images of flowers (reduced images) as a search result are displayed in the descending order of the degree of similarity (similarity level). The scroll button image 376 includes button images 376a, 376b, 376c. In this embodiment, by turning on the button image 376a or the button image 376b, or by sliding the button image 376c, the reduced images displayed in the display region 374 can be moved up and down. Accordingly, in a case that there are many reduced images as a search result, the entire search result (reduced images as candidates) can be seen by scrolling the screen.

For example, by touching a reduced image, a flower which matches the flower included in the imaged image by the outward cameras 18b, 18c can be selected from the search result. In the example of the search result screen 350 shown in FIG. 13, the reduced image having the highest similarity level (first place) is selected.

Although the detailed description is omitted, when the search result screen 350 is first displayed, the reduced image of the highest similarity level is selected on the lower screen 350b.

The button image 378 is provided to instruct selecting of imaging again. In this embodiment, when the button image 378 is turned on, imaging again is selected as described above to return to the imaging screen 150 shown in FIG. 8. Furthermore, a button image 380 is provided for seeing the detail (detailed information) of the flower represented by the selected image out of the entire search result. In this embodiment, as detailed information, classification of a flower (family name, generic name), information about the country of origin, a still image and a rotating image are included. Although the detailed description is omitted, these pieces of detailed information are coincident with viewable information when a normal electronic pictorial book mode is executed. Furthermore, as described later, the still image is a stereoscopic image, and the rotating image is a stereoscopic image capable of making a 36° rotation in the lateral direction (horizontal direction).

Figure 14:
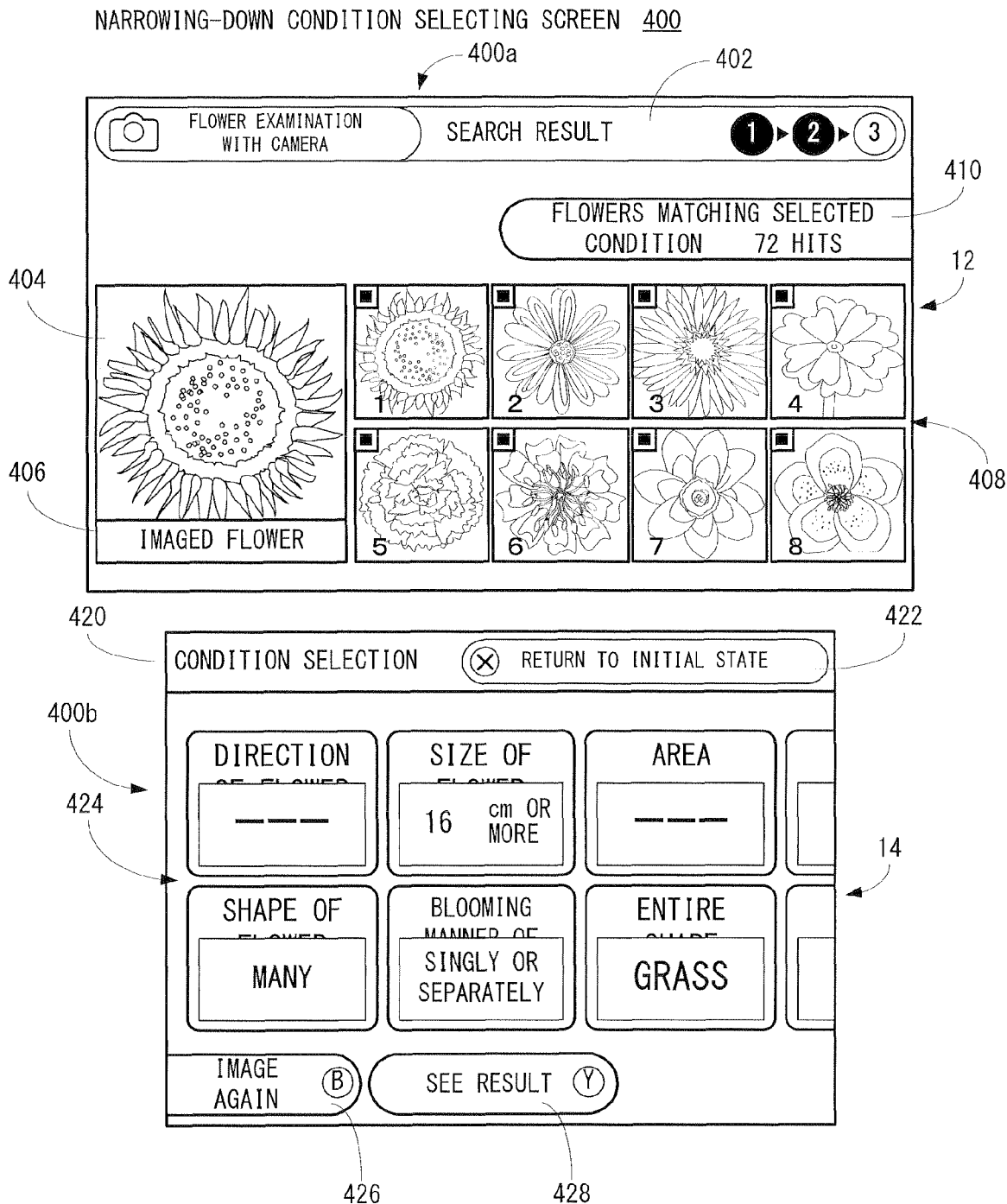
FIG. 14 shows an example non-limiting a narrowing-down condition selecting screen displayed on the stereoscopic LCD and the lower LCD of the game apparatus shown in FIG. 1.

For example, when the button image 372 is turned on on the search result screen 350 shown in FIG. 13, a narrowing-down condition selecting screen 400 shown in FIG. 14 is displayed on the stereoscopic LCD 12 and the lower LCD 14. The narrowing-down condition selecting screen 400 includes an upper screen 400a and a lower screen 400b.

As shown in FIG. 14, on the upper screen 400a, a display region 402 is provided at the upper end thereof. Furthermore, a display region 404 is provided on the left of the center of the upper screen 350a, and a display region 406 is provided below it. Also, on the right of the display region 404 and the display region 406, a display region 408 is provided. Then, between the display region 402 and the display region 408, a display region 410 is provided.

In the display region 402, that the flower-examination-with-camera mode is being executed, this is a screen for displaying a search result of the flower, and the progress status of the mode are indicated in characters, or the like. In the display region 404, a current imaged image is displayed. In the display region 406, a message that the image displayed in the display region 404 is an image of the imaged flower is described.

In the display region 408, reduced images of flowers as a search result are displayed in the descending order of the degree of similarity. In the example shown in FIG. 14, up to eight reduced images are displayed. In the display region 410, the number of flowers matching the selected condition is described. Here, the narrowing-down condition selecting screen 400 shown in FIG. 14 is a state before a condition is selected and set, and thus, the number of the search result shown in FIG. 13 is displayed as it is.

On the lower screen 400b, a display region 420 is provided at the upper end thereof, and a button image 422 is displayed within this display region 420. Also, below the display region 420, a display region 424 is provided, and below the display region 424, a button image 426 and a button image 428 are displayed.

In the display region 420, on the left of the button image 422, selecting a condition on the lower screen 400b is described. The button image 422 is provided for returning to the initial state. Thus, when the button image 422 is turned on, the set narrowing-down conditions are all cleared to return to a state in which no narrowing-down condition is set.

In the display region 424, a plurality of button images for selecting various narrowing-down conditions are displayed. Although illustration is omitted, by scrolling the screen right and left, button images for selecting other narrowing-down conditions are displayed on the display region 424. Here, in FIG. 14, as described above, a state in which no narrowing-down condition is selected is shown.

The button image 426 is provided for selecting imaging again. The button image 426 is the same as the above-described button image 232 and button image 378. The button image 428 is provided for seeing the result. When the button image 428 is turned on, reduced images of the flowers which satisfy one or a plurality of set narrowing-down conditions out of the search result are displayed in the display region 408 although illustration is omitted, and the number is displayed in the display region 410.

Figure 15:
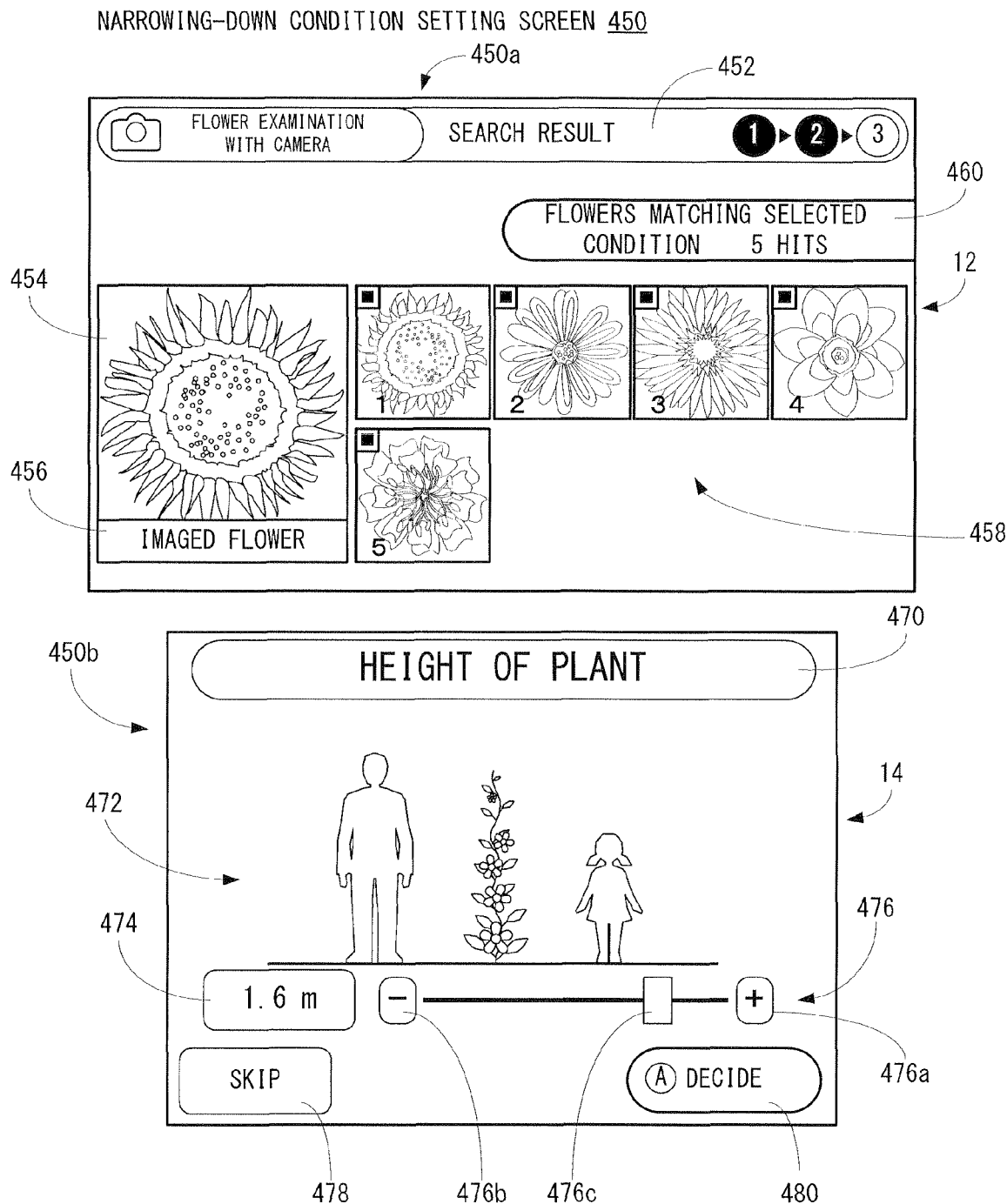
FIG. 15 shows an example non-limiting first narrowing-down screen displayed on the stereoscopic LCD and the lower LCD of the game apparatus shown in FIG. 1.

Additionally, when a button image of height of plant, for example, is turned on on the narrowing-down condition selecting screen 400 shown in FIG. 14, a narrowing-down condition setting screen 450 as shown in FIG. 15 is displayed on the stereoscopic LCD 12 and the lower LCD 14. It should be noted that as to the narrowing-down condition setting screen 450, on the lower screen 450b, a state in which the height of the plant is changed (selected) by utilizing a scroll button image 476 described later. As shown in FIG. 15, the narrowing-down condition setting screen 450 relating to the height of the plant includes an upper screen 450a and a lower screen 450b.

On the upper screen 450a, a display region 452 is provided at the upper part thereof. Furthermore, on the left of the center of the upper screen 450a, a display region 454 is provided, and below it, a display region 456 is provided. Also, on the right of the display region 454 and the display region 456, a display region 458 is provided. Then, between the display region 452 and the display region 458, a display region 460 is provided.

The upper screen 450a is the same as the upper screen 400a shown in FIG. 14 except for that the reduced images of the flowers as candidates obtained by being narrowed down under the condition of the height of the plant selected on the lower screen 450b are displayed on the display region 458, and the number of candidates is displayed in the display region 460, and therefore, a redundant description is omitted.

On the lower screen 450b, a display region 470 is provided at the upper end of thereof, and below the display region 470, a display region 472 is provided. In addition, below the display region 472, a display region 474 is provided, and on the right side of the display region 474, a scroll button image 476 is displayed. In addition, at the lower end of the lower screen 450b, a button image 478 and a button image 480 are displayed.

In the display region 470, a message that the lower screen 450b is a plant height setting screen is described. In the display region 472, the height of the plant is illustrated. In the display region 474, the current set value of the height of the plant is displayed. The scroll button image 476 includes button images 476a, 476b, 476c. By turning on the button image 476a and the button image 476b, or sliding the button image 476c, the height of the plant is changed. At this time, the illustrated height of the plant in the display region 472 is changed, or the set value of the height of the plant in the display region 474 is changed.

The button image 478 is provided for selecting (skipping the setting) not setting the height of the plant. Thus, when the button image 478 is turned on, the screen returns to the narrowing-down condition selecting screen 400 shown in FIG. 14 without setting the condition of the height of the plant. Also, the button image 480 is provided for setting (deciding) the height of the plant. Accordingly, when the button image 480 is turned on, the height of the plant set by using the scroll button image 476 is set as a narrowing-down condition, and the screen returns to the narrowing-down condition selecting screen 400 shown in FIG. 14.

In addition, when the button image 428 is turned on on the narrowing-down condition selecting screen 400 in FIG. 14 in a state that the narrowing-down condition is set, a narrowing-down result screen is displayed although illustration is omitted. For example, the reduced images of the flowers obtained by being narrowed down are displayed in the display region 424 of the lower screen 400b. Although illustration is omitted, the screen as a result of narrowing down (narrowing-down result screen) is similar to the search result screen 350 shown in FIG. 13, and the reduced images of the flowers obtained by being narrowed down are displayed in the display region 374 in the descending order of the degree of similarity.

In a case that the button image 428 is turned on in a state that no narrowing-down condition is set, a narrowing-down result screen approximately the same as the search result screen 350 shown in FIG. 13 is displayed.

Figure 16:
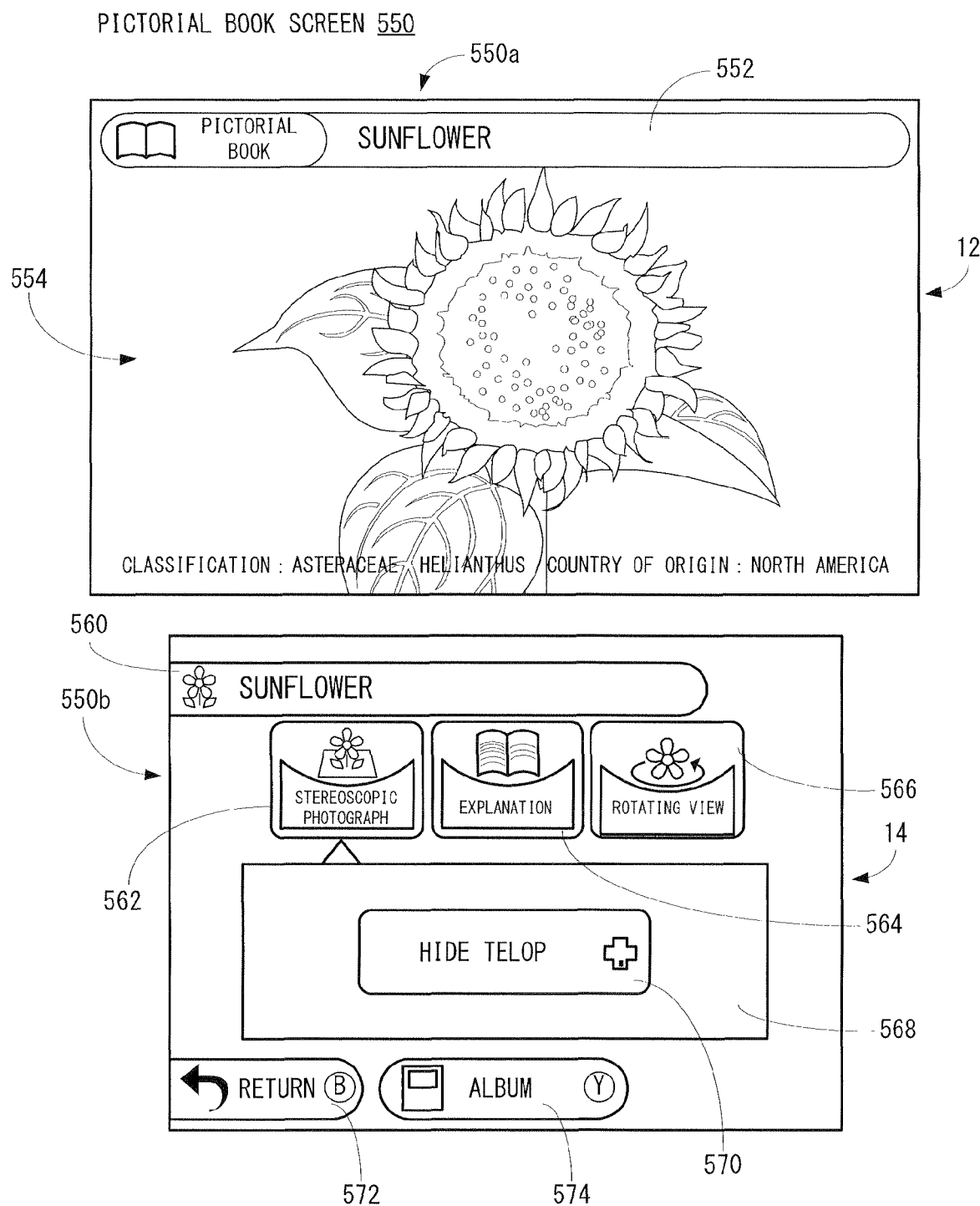
FIG. 16 shows example non-limiting pictorial book screen displayed on the stereoscopic LCD and the lower LCD of the game apparatus shown in FIG. 1.

Additionally, when a reduced image of a flower which seems to be the same as the imaged flower is selected on the narrowing-down result screen, the detailed information is displayed. The detailed information is as described above, and a pictorial book screen 550 as shown in FIG. 16, for example, is displayed on the stereoscopic LCD 12 and the lower LCD 14. The pictorial book screen 550 includes an upper screen 550a and a lower screen 550b.

As shown in FIG. 16, the upper screen 550a is provided with a display region 552 at the upper end thereof and a display region 554 except for the display region 552. In the display region 552, displaying the electronic pictorial book and the name of the flower displayed in the display region 554 are displayed in characters, or the like. In the display region 554, an image of a flower is displayed in the center. The image displayed here is a still image corresponding to the reduced image selected by the user on the search result screen 350 and the narrowing-down result screen. The still image can be stereoscopic. Also, at the lower end of the display region 554, classification of a flower (family name, generic name), and information about the country of origin as to the flower displayed in the display region 554 are displayed in telops. Here, as described later, the telop can be select between display and non-display.

On the lower screen 550b, a display region 560 is provided at the upper end thereof, and below the display region 560, button images 562, 564, 566 are displayed. Furthermore, below the button images 562-566, a display region 568 is provided, and below the display region 568, a button image 572 and a button image 574 are displayed.

In the display region 560, the name of the flower, etc. displayed on the upper screen 550a is displayed in characters, or the like. The button images 562, 564, 566 are provided for respectively displaying a still image, an explanation, and a rotating image out of the detailed information. When the button image 562 is turned on, a still image of the flower displayed in the display region 560 is displayed in the display region 554 of the upper screen 550*a*. When the pictorial book screen 550 is first displayed, the button image 562 has been turned on, and this state is shown in FIG. 16. The still image is an image of stereograph (stereoscopic image).

When the button image 564 is turned on, an explanation of the flower displayed in the display region 560 is displayed in the display region 554 of the upper screen 550*a*. Although illustration is omitted, as an explanation, for example, an image (imaged image) as to the flower displayed in the display region 552 and display region 560 is displayed, and the explanation of the flower is displayed in text form. Although illustration is omitted, when the button image 564 is turned on, at least a scroll button image is displayed in the display region 568, and by using this, the region where the explanation is displayed can be scrolled.

Figure 17:
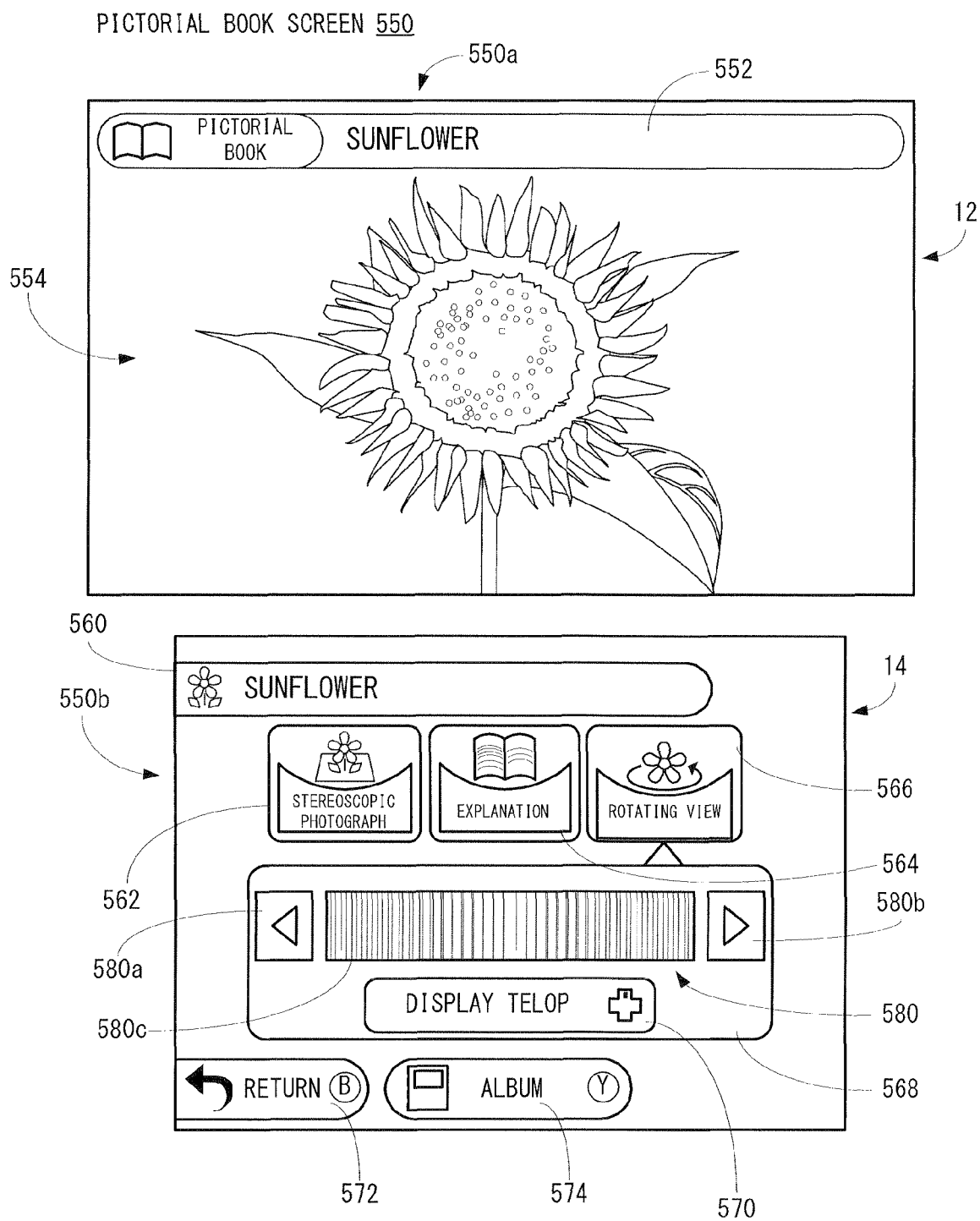
FIG. 17 shows another example non-limiting pictorial book screen displayed on the stereoscopic LCD and the lower LCD of the game apparatus shown in FIG. 1.
Figure 18:
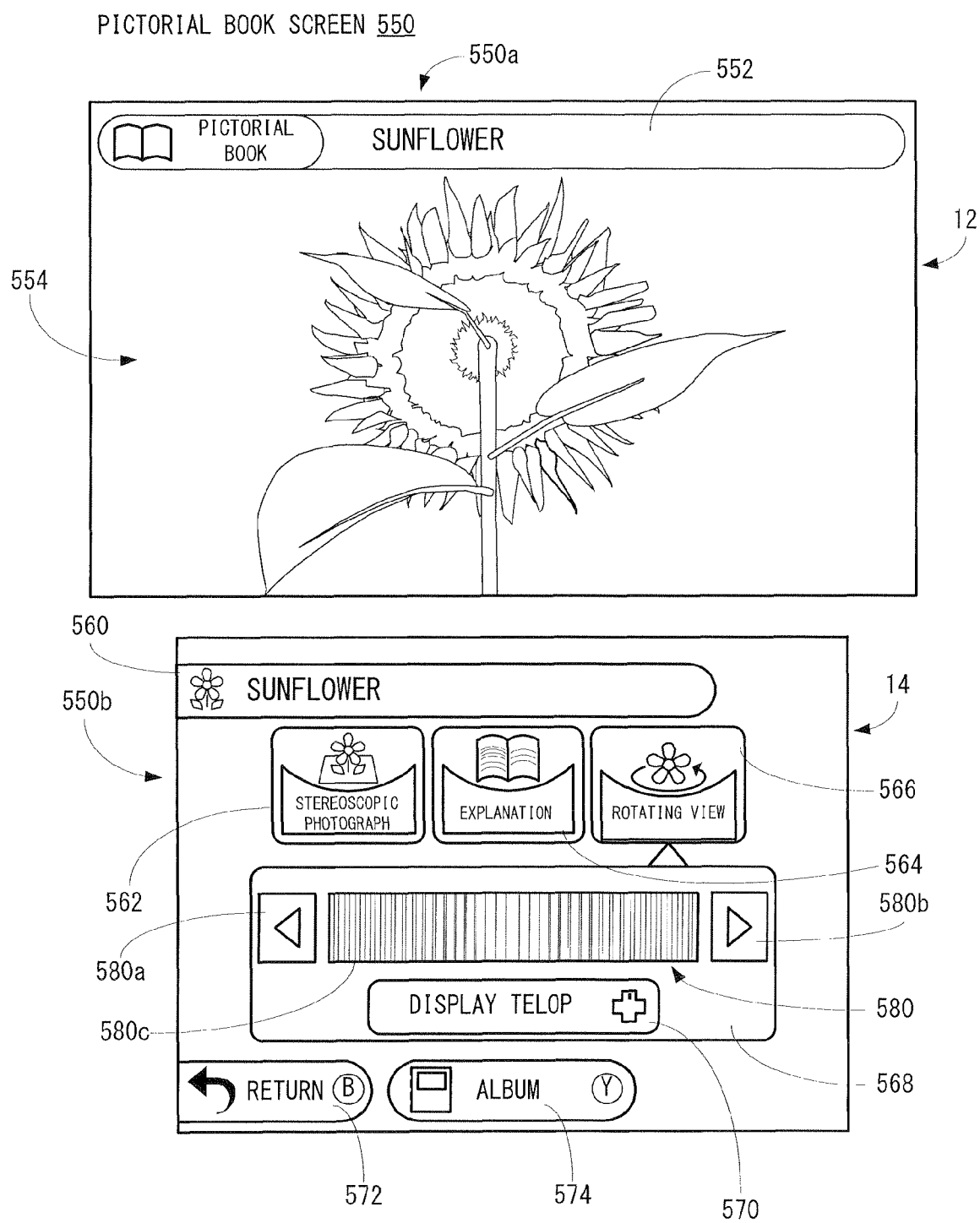
FIG. 18 shows still another example non-limiting pictorial book screen displayed on the stereoscopic LCD and the lower LCD of the game apparatus shown in FIG. 1.

When the button image 566 is turned on, a rotating image (rotatable stereoscopic image) of the flower displayed in the display region 560 is displayed in the display region 554 of the upper screen 550*a*. More specifically, as described later, the pictorial book screen 550 as shown in FIG. 17 and FIG. 18 is displayed on the stereoscopic LCD 12 and the lower LCD 14. Here, when the button image 566 is first displayed, the pictorial book screen 550 shown in FIG. 17 is displayed.

Returning to FIG. 16, in the display region 568, button images as to operations in relation to the respective button images 562-566 are displayed. As shown in FIG. 16, while the button image 562 is turned on, the button image 570 is displayed in the display region 568. The button image 570 is provided for hiding a telop (non-display).

Although illustration is omitted, in a case that a telop is displayed on the upper screen 550*a* as shown in FIG. 16, the button image 570 is used for inputting an instruction of hiding a telop, but in a case that a telop is not displayed, this is used for inputting an instruction of displaying a telop (see FIG. 17, FIG. 18).

A button image 572 is provided for returning to the search result screen 350 shown in FIG. 13 and the narrowing-down result screen not shown. Furthermore, a button image 574 is provided for displaying an album. When the button image 574 is turned on, images (flowers) imaged by the user are displayed on the stereoscopic LCD 12 in an album form although illustration is omitted.

For example, when the button image 566 is turned on to select displaying of a rotating image, the pictorial book screen 550 as shown in FIG. 17 is displayed. The pictorial book screen 550 shown in FIG. 17 is the same as the pictorial book screen 550 shown in FIG. 16 except for that the display content of the display region 568 is different, and therefore, a redundant description is omitted.

As shown in FIG. 17, on the pictorial book screen 550, the display region 568 is brought into association with the button image 566, in which a rotation button image 580 and the button image 570 are displayed. The rotation button image 580 includes button images 580*a*, 580*b*, 580*c*. When the button image 580*a* or 580*b* is turned on, or a sliding operation is performed on the button image 580*c*, the stereoscopic image of the flower displayed in the display region 554 of the upper screen 550*a* is rotated in response thereto. The stereoscopic image of the flower is rotated horizontally, for example.

In FIG. 18, the pictorial book screen 550 when the stereoscopic image of the flower is rotated about 180 degrees is displayed. Although illustration is omitted, for example, a stereoscopic image for each predetermined angle (one degree in this embodiment) is prepared, and therefore, by designating an arbitrary angle, the stereoscopic image of the flower can be viewed. This makes it possible to see the flower from various angles and easily determine whether or not the flower selected from the search result and the narrowing-down result is the same as the imaged flower. Furthermore, the actual flower and the stereoscopic image can be compared, capable of more enjoying the search result.

Up to this point, an overview of the operations by using each screen when the flower-examination-with-camera mode is executed is described, and a detailed description for obtaining the search result is made below. In the software of the application of this embodiment, a database for search for searching for a flower the same as the imaged flower is provided. The overview of the data for search included in the database for search is shown in FIG. 19. Here, the data for search is created as to all the flowers contained in the application (electronic pictorial book) of this embodiment.

As shown in FIG. 19, the data for search is assigned identification information (ID). Furthermore, the data for search roughly includes a name of the flower, color information, shape information, condition information and image information. The name of the flower is the name of the flower and described by the text data. The color information is histogram data. In this embodiment, as shown in FIG. 20(A), by using a cut-out image 600 obtained by cutting only the portion of the flower from the photograph of the flower for search (for verification), the color information of the flower for search is obtained, and from the obtained color information, a histogram is calculated. As shown in FIG. 20(B), two circles 610, 612 having different radiuses from the center of the cut-out image 600 are decided. Thus, as shown in FIG. 20(C), one cut-out image is divided into two areas (area A, area B). Here, in FIG. 20(C), for the sake of clarity, the image of the flower is omitted. Also, the sizes of the circle 610 and the circle 612 are fixed. In addition, the position (starting position) from which a line segment 614 starts to rotate is fixed.

As shown in FIG. 20(C), color information (R, G, B) in a case that the line segment 614 connecting the center point of the circles 610, 612 and a certain point on the circumference of the circle 610 is rotated about the center point by a predetermined angle is detected along the line segment at this time for each area A and area B. A histogram in which the color information every predetermined angle in a case that the line segment 614 is fully rotated is represented by numerical values is generated. Here, the histogram is generated every component (R, G, B) of the color information for each area A and area B.

Although illustration is omitted, in a case of the flower blooming in long clusters, the color information is detected as to only the frame in the shape of vertically-long track as shown in FIG. 9(B) in place of the circles 610, 612 from which a histogram is generated. Furthermore, in a case of the small flower, circles having diameters (or radiuses) half the circles 610, 612 are used, and the color information is detected as to only the inside of the circles from which the histogram is generated.

Also, in this embodiment, the color information is detected as to each of the area A and the area B by the two circles 610, 612, but color information of an area combining the area A and the area B may be detected by only the circle 610.

The shape information is the number of short petals, the number of long petals, a peripheral length of the flower, an area of the flower, complexity of the shape of the flower, a width of the rectangle circumscribed about the outline of the flower, a height of the rectangle circumscribed about the outline of the flower, a shape category and a judgment flag. Here, the shape category is used for further filtering the data for search included in the database for search. Also, the number of short petals, the number of long petals, the area of the flower and the complexity of the shape of the flower are used to obtain the similarity level of the shape.

Before converting the information into numerical values, an outline of the flower is first detected from the binarized image of the flower. Then, the center of gravity of the flower is calculated. Next, as shown in FIG. 21(A), from the coordinates (point) of the calculated center of gravity G, an arbitrary point on the outline 700 is decided as a starting point, and a distance T (the number of dots) from the starting point to each of all the points on the outline is measured clockwise (counterclockwise may be possible) in order.

Then, a graph (shape graph) is created, on which the longitudinal axis represents distance T, and the horizontal axis represents an order in which the distance T is measured. As described by using FIG. 21(A), the shape graph as a result of measuring the distance T is shown in FIG. 21(B). In FIG. 21(B), a cross mark is applied to boundary ups and downs. Here, black crosses means peaks, and white crosses means troughs.

By using the shape graph, numerical values of the above-described information are calculated. This is briefly described below.

The number of short petals is obtained by counting only the number of small peaks from the shape graph. In this embodiment, the small peak means a peak being smaller than 6% of the image size. Here, the size of the peak is the distance T at the position to which a black cross is applied. The image size is here a total number of dots of the cut-out image 600, and is set to the same value as to all the flowers. This holds true below.

Similarly, the number of long petals is obtained by counting only the number of large peaks from the shape graph. In this embodiment, the large peak means a peak being 6% or more of the image size.

The peripheral length of the flower is the number of dots (the number of pixels on the outline) on the detected outline. The area of the flower is a total number of dots (the number of pixels) within the outline including the dots on the outline. The complexity of the shape of the flower is a numerical value calculated by dividing the peripheral length of the flower by the area of the flower.

The width of the rectangle circumscribed about the outline of the flower is the number of dots (the number of pixels) corresponding to the width of a rectangle 710 in a case that the rectangle 710 circumscribed about the outline of the flower (object) is obtained as shown in FIG. 21(C). Similarly, the height of the rectangle circumscribed about the outline of the flower is the number of dots (the number of pixels) corresponding to the height of the rectangle 710 in a case that the rectangle 710 circumscribed about the outline of the flower (object) is obtained as shown in FIG. 21(C)).

The shape category is classification about the shape of flowers and petals. In this embodiment, they are classified according to the three judgment methods (judgment of the shape of the flower, judgment of the complexity of the flower, and judgment of the shape of the petals). Each judgment method is described below. The judgment result corresponds to the shape category.

(1) Judgment of the Shape of the Flower

The shape category is judged in the following manner. In a case that the difference between the height and the width of the rectangle circumscribed about the object is equal to or more than 30%, and if the height is larger, a "vertically long flower" is judged, and if the width is larger, a "horizontally long flower" is judged. Furthermore, in a case that the difference between the height and the width of the rectangle circumscribed about the object falls between 20% to 10%, and if the area of the object is less than 40% of the rectangle circumscribed about the object, a "narrow flower" is judged, and if the area of the object is equal to or more than 40% of the rectangle circumscribed about the object, a "flower of a uniform shape in length and width" is judged. In addition, in a case that the difference between the height and the width of the rectangle circumscribed about the object is less than 10%, a "flower of a uniform shape in length and width" is judged.

(2) Judgment of the Complexity of the Flower

The complexity of the flower is judged in the following manner. If the complexity of the flower calculated as described above is less than a first threshold value, "not being complex" is judged. Alternatively, if the complexity of the flower is equal to or more than a second threshold value being larger than the first threshold value, "being very complex" is judged. And, if the complexity of the flower is equal to or more than the first threshold value and less than the second threshold value, "being complex" is judged.

(3) Judgment of the Shape of the Petal

The shape of the petal is judged in the following manner. It is determined whether or not the shape of the flower is zigzagged. In a case that there are 11 petals or more irrespective of the sizes of them, "being zigzag" is judged. Here, the judgment is performed on only the flower for which the shape of the flower is the "flower of uniform shape". Furthermore, it is judged whether or not longer petals and shorter petals are equal in number. Here, the judgment is performed on only the flower for which the shape of the flower is the "flower of uniform shape". In addition, it is judged whether or not the flower is round-shaped. For example, in a case that the number of peaks is equal to or less than 2 in the shape graph, a round-shaped, that is, round or oval flower is judged.

The judgment flag is a flag for judging whether or not the outline is accurately defined, and turning on (establishment) or off (non-establishment) the flag is described by numerical values of 1 or 0. In a case that the outline is accurately defined, the judgment flag is turned on, and is described by "1". On the other hand, in a case that the outline is not accurately defined, the judgment flag is turned off, and is described by "0".

However, in a case that any one of three conditions shown below is satisfied, it is judged that the outline is not accurately taken. That is, if no three conditions are satisfied, it is judged that the outline is accurately taken.

(1) The outline of the flower (object) is apart from the center of the image. More specifically, at the center of the cut-out image 600, a circle being 3% of the image size is arranged, and in a case that the circle is not included within the outline, it is judged that the condition (1) is satisfied.

(2) The area of the outline of the flower (object) is extremely small. More specifically, in a case that the area of the outline is equal to or less than 3% of the image size, it is judged that the condition (2) is satisfied.

(3) The center of gravity of the outline of the flower (object) is out of the outline. More specifically, in a case that the center of gravity G is out of the outline, it is judged that the condition (3) is satisfied.

Here, although detailed description is omitted, as to the small flower (flower having the size being less than 2 cm), the shape information is neglected.

Returning to FIG. 19, the condition information corresponds to a size of the flower, a time of bloom, the degree of encounter, how flowers bloom, a shape of the flower, kinds, a direction of the flower, and a height of the plant, etc.

The size of the flower is the length of the diameter of the circle circumscribed about a flower, and is described by an average length. The time of bloom is a period (days and months) when a flower blooms, and described by the first and the last days and months of the period. The degree of encounter is a large and small of the frequency of encountering a flower, for example, and the degree of encounter is set to be high as to the flowers which have generally been well known and can be seen nationally. On the other hand, as to the flowers which have not generally been known and can be seen in some regions, the degree of encounter is set to be low. Here, the degree of encounter is set to be medium as to the flowers except for the above description.

How flowers bloom is information about how flowers bloom, and is described by "thinness (single flower)", "thickness", "long clusters", and "others" in this embodiment. The "thinness" corresponds to a flower which blooms singly, or flowers bloom separately. The "thickness" corresponds not to a flower which blooms singly, but to a plurality of flowers which bloom in a relatively narrow range and heavily dense on the stem. The "long clusters" corresponds not to a flower which blooms singly, but to flowers which bloom in long clusters. The "others" correspond to flowers which do not correspond to the "thinness", the "thickness", and the "long clusters".

The shape of the flower is information indicating the external shape of a single flower, and described by "the number of petals (3 petals, 4 petals, 5 petals, 6 petals, many)", an "apparent shape of a petal (trumpet-shaped or bell-shaped, not circle)", and "others" in this embodiment. "The number of petals" and the "apparent shape of a petal" are as illustrated, and it is thought that no description is made. The "others" are flowers which do not classified under the conditions, such as "the number of petals" and the "apparent shape of a flower" as described above.

As kinds, any one of "grass flower", "tree flower", and "climbing plant" is described. The direction of the flower is described by any one of "upward direction", "downward direction", and "others" as kinds. Here, "others" is flowers which do not correspond to the "upward direction" and the "downward direction". The height of the plant is the height of the grass in a case of the grass flower, and is described by an average value. Accordingly, in a case of flowers (plants) other than the grass flower, the field of the height of the plant is left blank.

It should be noted that although the detailed description is omitted, the color of the flower, the silhouette, the environment, the region, etc. are described as other condition information.

The image information is image data about reduced images of respective flowers. In this embodiment, reduced images are prepared in advance so as to be included in the data for search, but from images to be displayed in the electronic pictorial book, the thumbnail images may be generated.

Thus, the data for search includes various pieces of information, and is utilized when the flower included in the imaged image is searched. Here, processing of searching (examining) for the flower included in the imaged image is described. First, a flower as a search target is imaged by using the outward cameras 18b and 18c to thereby obtain imaged image data corresponding to respective imaged images. Next, similar to a case of creating the data for search as described above, from the imaged image data, the color information of the imaged flower is obtained to thereby generate a histogram. Here, the two imaged images are acquired by the outward cameras 18b and 18c, but by using any one of the imaged images, the histogram is generated. Also, a portion enclosed by the round frame of the designation image 154a from the imaged image is divided into two areas A and B as shown in FIG. 20(B) and FIG. 20(C). Here, the round frame of the designation image 154a corresponds to the circle 610 shown in FIG. 20(B) and FIG. 20(C).

Next, the shape information of the imaged flower is created in the method the same as that of creating the data for search. First, the imaged image is binalized, and by using the binalized imaged image, the outline (edge) of the flower is extracted.

When the outline is extracted, the distance T between each dot on the outline and the center of gravity G of the image of the flower is sequentially measured to thereby generate a shape graph as shown in FIG. 21(B). On the basis of the shape graph, shape information (amount of feature of the shape) is obtained as described above. Here, the shape information is the number of short petals, the number of long petals, the peripheral length of the flower, the area of the flower, the complexity of the shape of the flower, the width of the rectangle circumscribed about the outline of the flower, the height of the rectangle circumscribed about the outline of the flower, the shape category and the judgment flag.

Next, on the basis of the imaged image, the size of the flower (the diameter of the circle circumscribed about the flower) is calculated. In this embodiment, from the parallax of the outward cameras 18b, 18c, the distance from the outward cameras 18b and 18c to the object (flower) is calculated by triangulation. As explained simply, in this embodiment, color information (RGB values) at the center potion of the imaged image by the outward camera (right camera) 18c is obtained. Next, the difference between the obtained color information and the color information in each pixel imaged by the outward camera (left camera) 18b is horizontally searched for each dot from the center to the right end. As a result, the area with less difference is regarded as a matching candidate. Here, if the difference with the matching candidate is large, processing is performed by regarding the object as being at close range from the outward cameras 18b, 18c (game apparatus 10). On the other hand, if the difference with the matching candidate is small, the number of dots (the number of displaced dots) from the center of the imaged image by the outward camera (left camera) 18b to the area of the matching candidate is obtained.

Next, from the obtained number of displaced dots, an angle (first angle) of the object when seen from the outward camera (left camera) 18b is calculated. In this embodiment, because it is assumed that the outward camera (right camera) 18c vertically captures the object, an angle (second angle) from the outward camera (right camera) 18c to the object is regarded as 90 degrees. From the positional relationship (placement distance) between the first angle and the second angle, and the outward camera 18b and the outward camera 18c, the distance to the object is obtained by triangulation.

Then, from the distance to the object and the angle of view of the outward cameras 18b, 18c, the size of the imaged flower is obtained. The size is calculated as distance×tan (horizontal angle of view). Here, in this embodiment, it is assumed that the object (flower) is imaged to be in alignment with the frame represented by the designation images 154, 180, 182, 184, 186. Although detailed explanation is omitted, in a case that the small flower finder is selected, unlike the case that the single flower finder is selected, the distance to the object is calculated on the basis of the image for which only the central portion is trimmed. Here, the central portion means the range defined by the designation image 186 shown in FIG. 10(B).

Although the detailed description is omitted, in a case that the finder except for the small flower finder is selected, when it is determined that the object is at close range, imaging again may be prompted, or the size of the flower when imaging at close range is obtained in advance, and the size may be estimated as a size of the flower. Or, imaging by using the small flower finder may be prompted.

When the histogram of the imaged flower, the shape information and the size are obtained, filtering the data for search included in the database for search is further performed. This is for reducing the processing load and heightening accuracy of search as described above. In this embodiment, by paying attention to the shape category included in the shape information, the data for search of the shape category different from the shape category of the imaged flower is excluded from the search target. That is, only the data for search being the same in the shape category is used.

After completion of filtering the data for search depending on the shape category, the histogram of the imaged flower, the shape information and the size are checked against all the data for search to be used to thereby evaluate the degree of approximation of the color, the degree of matching of the shape and the degree of matching of the size. In this embodiment, as the degree of approximation and the degree of matching are high, a high score is added, and as the degree of approximation and the degree of matching are low, a low score is added. Although the detailed description is omitted, scores as to the degree of approximation of the histogram, the degree of matching of the shape and the degree of matching of the size are decided between 0 and 1. Here, in a case that any one of the scores (the degree of approximation or the degree of matching) is stressed, weighting may be performed.

For example, the score as to the degree of approximation of the color is calculated, and a list (similarity level list) in which flowers indicated by the data for search are arranged in the descending order of the score is generated. In the similarity level list, the score indicating the degree of approximation of the color is described in correspondence with each name of the flower or each ID, and these flowers are arranged in the descending order of the score. Here, the flowers with the same scores are arranged at random.

Next, the score of the degree of matching of the shape is calculated and added. The degree of matching of the shape is calculated on the basis of the difference between the number of long petals, the difference between the number of short petals, the difference between the complexities and the difference between the areas. As to each of the items, the score is calculated between 0 and 1, and each score is divided by 4. Here, if the number of long petals and the number of short petals are more than those of the object (imaged flower), the score is set to 0. Furthermore, as to each item, as the degree of matching is high, the score is set to be high, and as the degree of matching is low, the score is set to be low.

In addition, the score of the degree of matching of the size of the flower is calculated and added. The score of the size of the flower is also set between 0 and 1. As the degree of matching of the size of the flower is high, the score is set to be high, and as the degree of matching is low, the score is set to be low.

Also, in this embodiment, if a calendar matches the time of bloom, the score is added by one, and if not, the score is not added. More specifically, it is determined whether or not the day and time indicated by a calendar set to the game apparatus 10 is within the time of bloom included in the condition information of the data for search.

Although the detailed description is omitted, in the game apparatus 10, the calendar is set to the microcomputer 56, and the calendar is updated on the basis of the time information counted by the RTC 56a. Accordingly, the calendar managed by the microcomputer 56 is referred.

In addition, the score of the degree of encounter is added. The degree of encounter is set to be high, low, and middle as described, and in a case of being high, the score is added by 1, in a case of being middle, the score is added by 0.5, and in a case of being low, the score is not added.

When the scores of the degree of matching of the shape, the degree of matching of the size of the flower, the degree of matching of the time of bloom and the degree of encounter are thus added, the similarity level list is rearranged in the descending order of the scores.

In this embodiment, the user is next made to select the first and second conditions (shape and kind of a flower in this embodiment), which narrows down the candidates included in the similarity level list, to thereby obtain the search result. This is because that the candidates are too many by merely filtering with how flowers bloom, the direction of flower, and the shape category.

In addition, in a case that the user sets a narrowing-down condition, only the candidates which satisfy the narrowing-down condition are extracted from the candidates of the search result.

Figure 22:
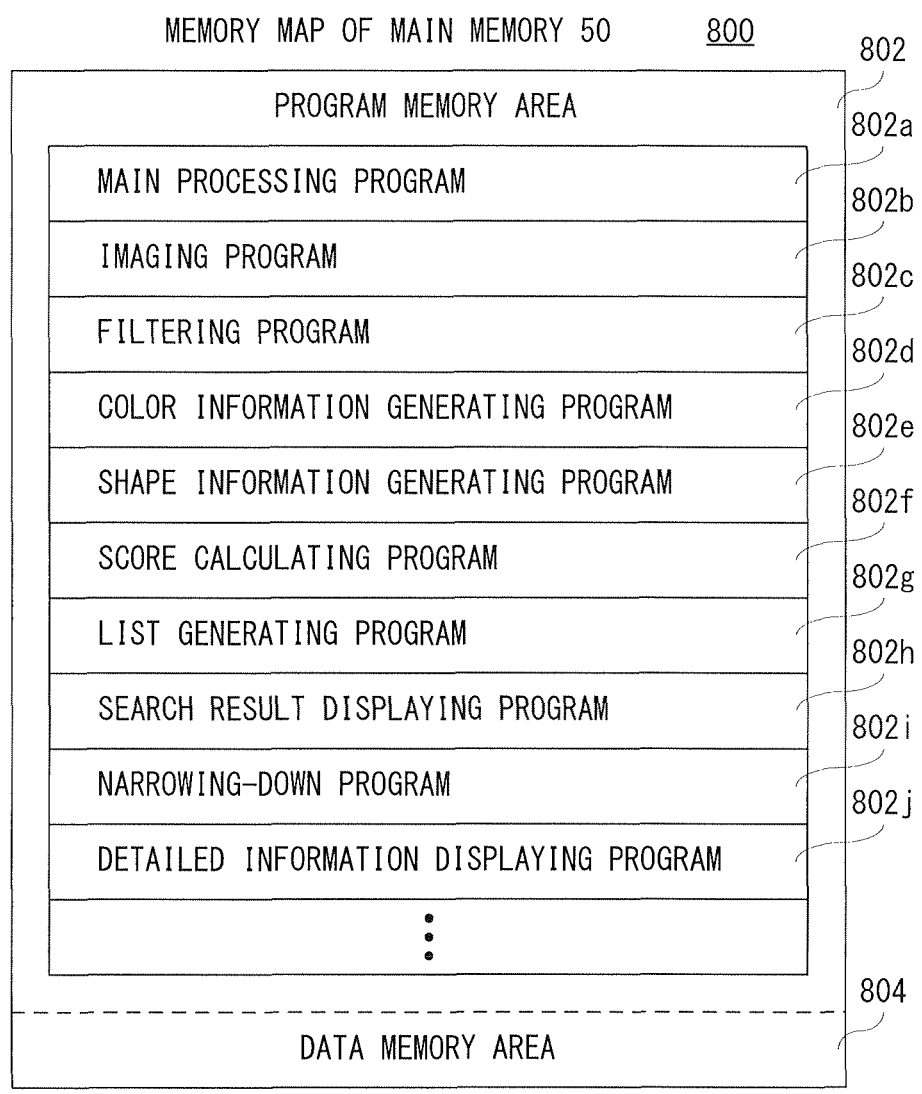
FIG. 22 shows an example non-limiting memory map of a main memory shown in FIG. 4.

FIG. 22 shows one example of a memory map 800 of the main memory 50 shown in FIG. 4. As shown in FIG. 22, the main memory 50 includes a program memory area 802 and a data memory area 804. In the program memory area 802, an information processing program, that is, a program of the application of this embodiment is stored. The information processing program is made up of a main processing program 802a, an imaging program 802b, a filtering program 802c, a color information generating program 802d, a shape information generating program 802e, a score calculating program 802f, a list generating program 802g, a search result displaying program 802h, a narrowing-down program 802i, a detailed information displaying program 802j, etc.

The main processing program 802a is a program for processing a main routine of the application of this embodiment. The imaging program 802b is a program for imaging a 2D image or a 3D image by using the cameras 18a-18c. Also, the imaging program 802b is a program for selecting a finder according to an instruction from the user, and acquiring the color of the through image to change the color of the designation images 154, 180, 182, 184, 186 before an imaging instruction is issued.

The filtering program 802c is a program for filtering the data for search included in the database for search. More specifically, in correspondence with the how the flower blooms and the direction of the flower that are indicated by the finder used in imaging, the data for search which does not satisfy these conditions is deleted from the candidates of the search. In addition, as described later, in correspondence with the shape category included in the shape information generated according to the shape information generating program 802e, the data for search of the different shape category is deleted from the candidates of the search.

The color information generating program 802d is a program for acquiring color information (RGB) from the imaged image and generating a histogram from the acquired color information.

The shape information generating program 802e is a program for creating a shape graph from the imaged image and generating shape information (the number of short petals, the number of long petals, the peripheral length of the flower, the area of the flower, the complexity of the shape of the flower, the width of the rectangle circumscribed about the outline of the flower, the height of the rectangle circumscribed about the outline of the flower, the shape category and the judgment flag).

The score calculating program 802f is a program for calculating a score indicating the similarity level with each data for search to be used by using the histogram, the shape information and the size as to the imaged image (imaged flower). The list generating program 802g is a program for creating a list in which candidate flowers are arranged in the descending order of the scores by using the score indicating the similarity level calculated according to the score calculating program 802f and the scores of the degree of matching of the time of bloom and the degree of encounter.

The search result displaying program 802h is a program for extracting candidates which match the first and second conditions from the similarity list and displaying them as a search result. The narrowing-down program 802i is a program for narrowing down the candidates from the search result to the candidates which match the narrowing down condition selected by the user. The detailed information displaying program 802j is a program for displaying the still image, the explanation, the rotating image, etc. as to the candidate flower (reduced image) selected by the user by using pictorial book data 804b described later.

Although the illustration is omitted, in the program memory area 802, a program for backing up various data, a program for outputting sound (sound effect, BGM), etc. are also stored.

Figure 23:
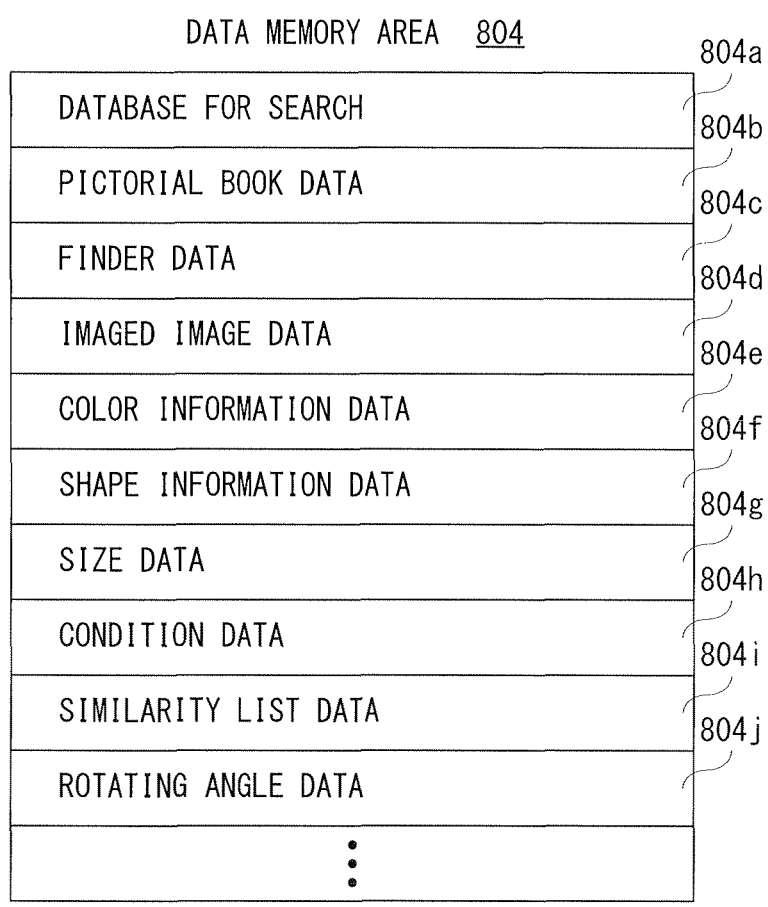
FIG. 23 shows an example non-limiting a detailed content of the data memory area shown in FIG. 22.

FIG. 23 shows detailed contents of the data memory area 804. As shown in FIG. 23, in the data memory area 804, a database for search 804a, pictorial book data 804b, finder data 804c, imaged image data 804d, color information data 804e, shape information data 804f, size data 804g, condition data 804h, similarity list data 804i and rotating angle data 804j.

Figure 24:
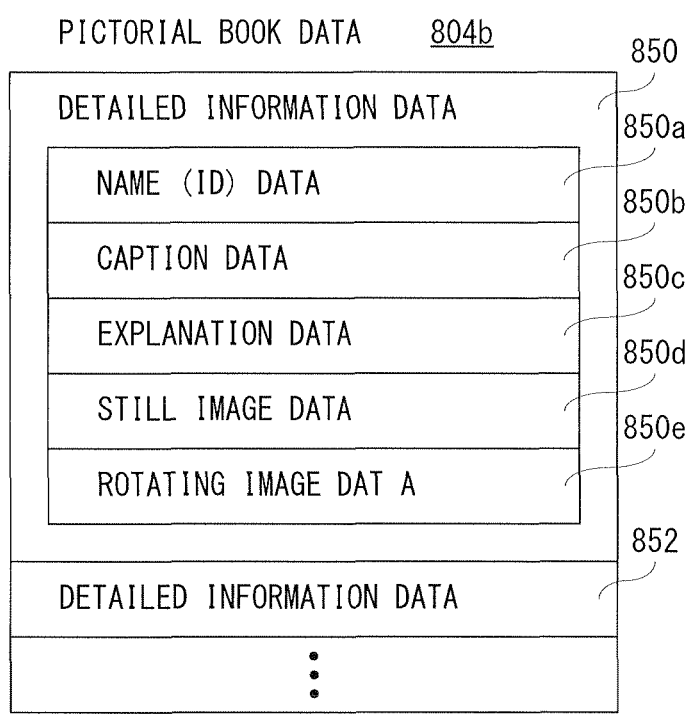
FIG. 24 shows an example non-limiting overview of pictorial book data shown in FIG. 23.

The database for search 804a is a database of the data for search as to all the flowers contained in the electronic pictorial book (pictorial book data 804b). The pictorial book data 804b is data as to the electronic pictorial book. More specifically, as shown in FIG. 24, the pictorial book data 804b includes detailed information data 850, 852, . . . of each flower. The detailed information data 850 includes name (ID) data 850a, caption data 850b, explanation data 850c, still image data 850d and rotating image data 850e.

The name (ID) data 850a is data as to a name (ID) of the flower. The caption data 850b is data of textual information as to the kind of the flower (family name, generic name) and the country of origin, and used for displaying telops. The explanation data 850c is data of the still image and the explanatory text of the flower. The still image data 850d is still image data of the flower, and this still image is a three-dimensional image. The rotating image data 850e is rotating image data of the flower, and the rotating image is an 3D image in a case that the still image is rotated horizontally by a predetermined angle (by one degree through 360 degrees, for example).

Returning to FIG. 23, the finder data 804c is data as to the how the flower blooms, the size of the flower, the direction of the flower that are decided depending on the finder used in imaging. Here, as the how the flower blooms, "thinness (single flower)", "thickness" or "long clusters" is described. Furthermore, as the size of the flower, "small flower" or "others" is described. In addition, as the "direction of the flower", "downward direction" or "directions other than downward direction" is described.

The imaged image data 804d is data as to an image imaged by each of the outward cameras 18b, 18c. The color information data 804e is histogram data generated according to the above-described color information generating program 802d.

The shape information data 804f is data as to the shape information (the number of short petals, the number of long petals, the peripheral length of the flower, the area of the flower, the complexity of the shape of the flower, the width of the rectangle circumscribed about the outline of the flower, the height of the rectangle circumscribed about the outline of the flower, the shape category and the judgment flag) generated according to the shape information generating program 802e. The size data 804g is data as to the size of the imaged flower.

The condition data 804h is data as to the first and second conditions and the narrowing-down condition. The similarity list data 804i is data of the similarity list generated according to the list generating program 802g and then narrowed down by the narrowing-down program 802i. The rotating angle data 804j is data as to a rotating angle in a case that the rotating image is displayed.

Although illustration is omitted, in the data memory area 804, other data necessary for execution of the application (information processing) of this embodiment is stored, and flags and counters (timers) necessary for the execution are provided.

Figure 25:
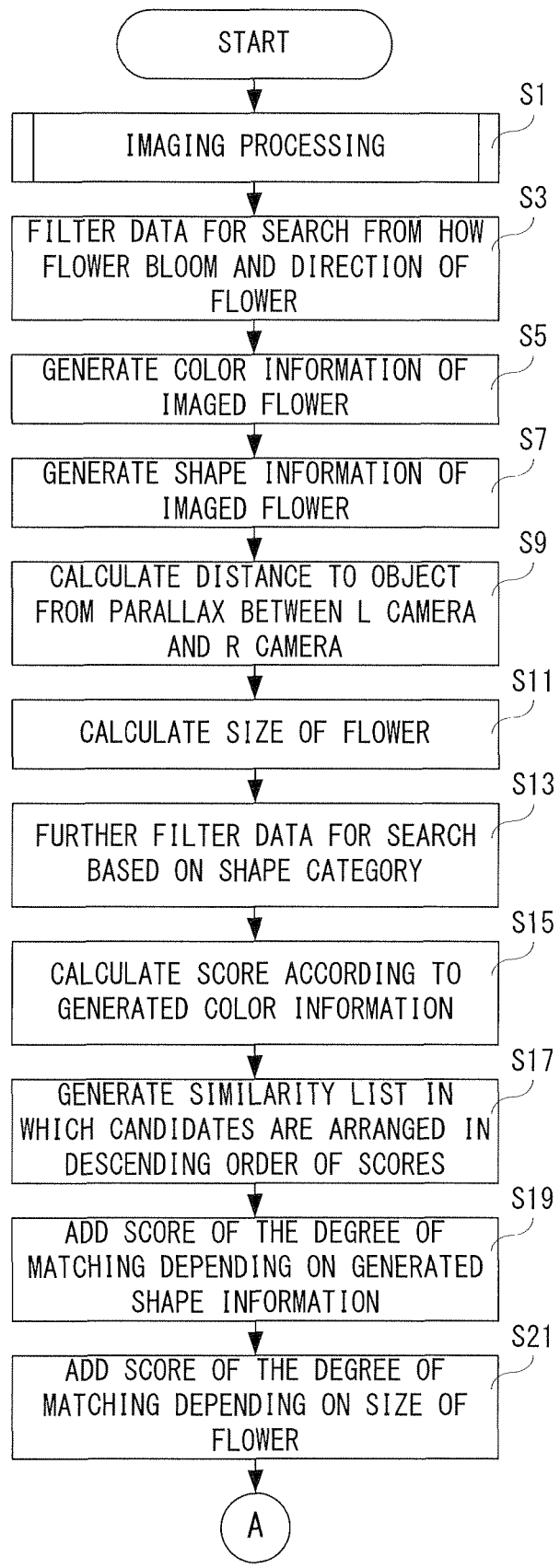
FIG. 25 shows an example non-limiting flowchart showing a first part of flower examining processing by a CPU shown in FIG. 4.
Figure 26:
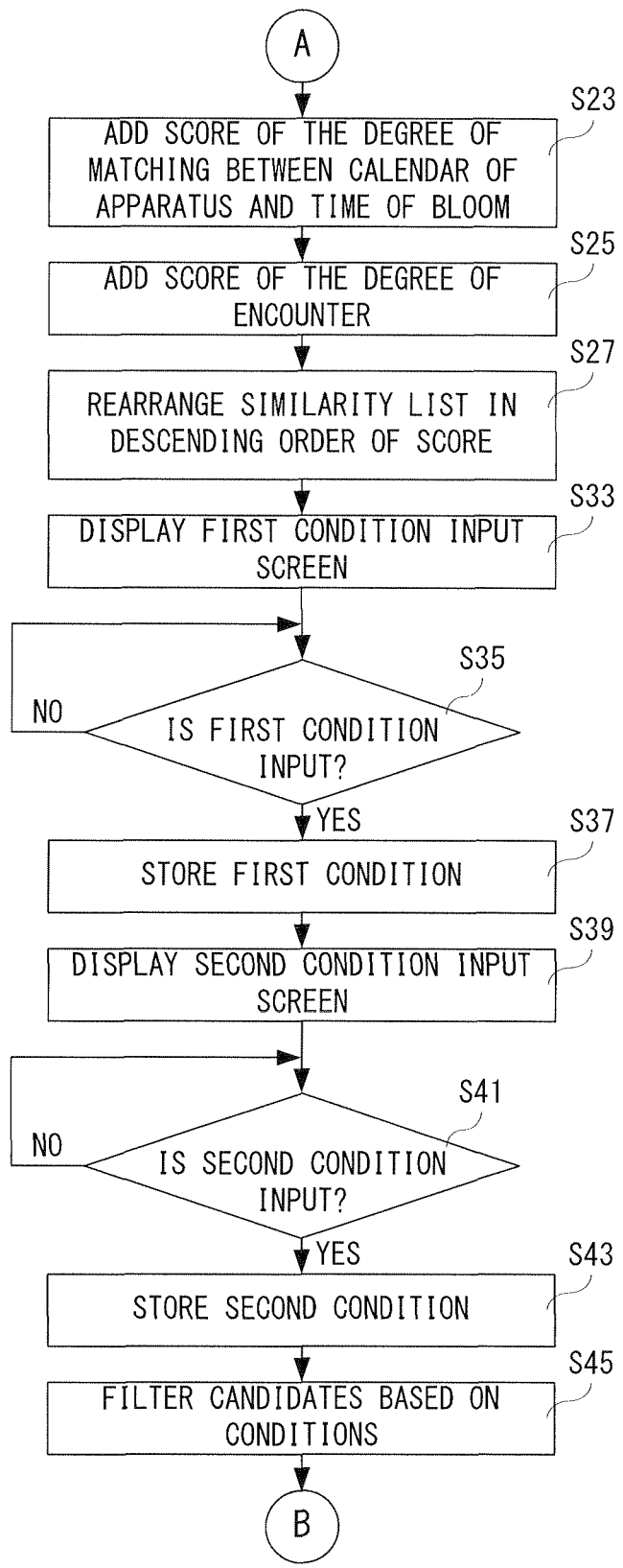
FIG. 26 shows an example non-limiting flowchart showing a second part of the flower examining processing by the CPU shown in FIG. 4, and being sequel to FIG. 25.

FIG. 25 to FIG. 28 is a flowchart showing processing (flower examining processing) by the CPU 44a in order to execute the above-described flower-examination-with-camera mode. As described above, when the button image 104 is turned on on the title screen 100, the flower examining processing is started as shown in FIG. 25, and imaging processing described later (see FIG. 31) is executed in a step S1.

In a next step S3, the data for search is filtered on the basis of the how the flower blooms, the size of the flower and the direction of the flower. That is, the data for search which does not match the configuration (feature) of the flower decided depending on the finder to be used in imaging is deleted from the object to be used in the search processing. For example, in a case that the "thinness (single flower)" is described as the how the flower blooms indicated by the finder data 804c, the data for search in which "thickness" and "long clusters" are described is deleted. Furthermore, for example, in a case that the "small flower" is described as the size of the flower indicated by the finder data 804c, the data for search in which a numerical value of 2 cm or more is described as the size of the flower is deleted. In addition, for example, in a case that "downward direction" is described as the direction of the flower indicated by the finder data 804c, the data for search in which a direction other than the downward direction is described as the direction of the flower is deleted. These are examples, and these hold true for other cases. Accordingly, the number of data for search to be used in the search processing is reduced.

Succeedingly, in a step S5, the color information of the imaged flower is generated. That is, as described above, the histogram data as to each of the area A and the area B is generated. Successively, in a step S7, the shape information of the imaged flower is generated. That is, as described above, the data as to each of the number of short petals, the number of long petals, the peripheral length of the flower, the area of the flower, the complexity of the shape of the flower, the width of the rectangle circumscribed about the outline of the flower, the height of the rectangle circumscribed about the outline of the flower, the shape category and the judgment flag is generated.

In a succeeding step S9, the distance to the object (flower) is calculated from the parallax between the L camera (outward camera 18b) and the R camera (outward camera 18c).

Then, in a step S11, the size of the imaged flower is calculated. In a next step S13, the data for search is filtered on the basis of the shape category. Accordingly, the data for search different in the shape category is excluded from the object to be used in the search processing to thereby further decrease the number of data for search to be used in the search processing.

Here, in a case that the small flower finder is used in imaging, the shape of the flower is neglected, and thus, the processing in the steps S7 and S13 is omitted.

In a step S15, scores as to candidates are calculated according to the generated color information, and in a step S17, the similarity list in which candidates are arranged in the descending order of the score is generated. Next, in a step S19, a score of the degree of matching depending on the generated shape information is added, and in a step S21, a score of the degree of matching depending on the size of the flower is added. In addition, in a step S23 shown in FIG. 26, a score of the degree of matching between the calendar of the apparatus and the time of bloom is added, and in a step S25, a score of the degree of encounter is added.

In a next step S27, the similarity list is rearranged in the descending order of the score. In a next step S33, the first condition input screen as shown in FIG. 11 is displayed. In a next step S35, it is determined whether or not the first condition is input. Here, the CPU 44a determines whether or not the button image 292 is turned on in a state that any one of the button images 272 to 188 is turned on.

If "NO" in the step S35, that is, if the first condition is not input, the process returns to the same step S35. Although illustration is omitted, in a case that the button image 290 is turned on, the process returns to the step S1 shown in FIG. 25 for imaging again. At this time, the imaged image data 804d, the color information data 804e, the shape information data 804f, the size data 804g, the condition data 804h, and the similarity list data 804i are cleared. This holds true for a case that imaging again is selected below.

On the other hand, if "YES" in the step S35, that is, if the first condition is input, the first condition is stored in a step S37. That is, the condition data 804h is updated. In a next step S39, the second condition input screen 300 as shown in FIG. 12 is displayed. Successively, in a step S41, it is determined whether or not the second condition is input. Here, the CPU 44a determines whether or not the button image 332 is turned on in a state that any one of the button images 322-328 is turned on.

If "NO" in the step S41, that is, if the second condition is not input, the process returns to the step S41 as it is. Although illustration is omitted, if the button image 330 is turned on, the process returns to the step S33. On the other hand, if "YES" in the step S41, the second condition is stored. That is, the condition data 804h is updated. In a next step S45, the candidates are filtered based on the conditions. That is, the CPU 44a deletes the candidates which do not match the first and second conditions from the similarity list.

Figure 27:
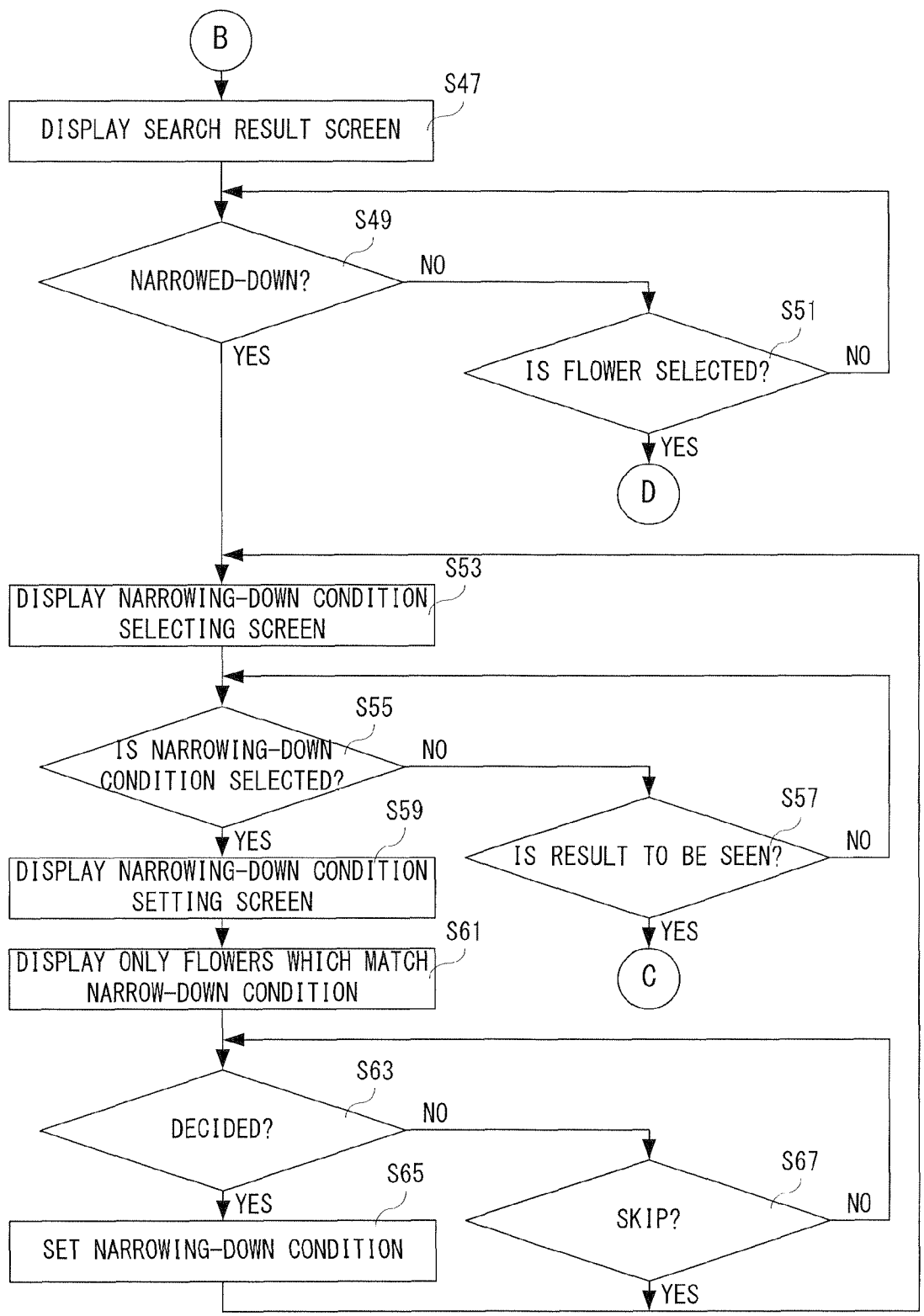
FIG. 27 shows an example non-limiting flowchart showing a third part of the flower examining processing by the CPU shown in FIG. 4, and being sequel to FIG. 26.

As shown in FIG. 27, in a next step S47, the search result screen 350 as shown in FIG. 13 is displayed. In a succeeding step S49, it is determined whether or not the candidates have to be narrowed down. That is, the CPU 44a determines whether or not the button image 372 is turned on.

If "NO" in the step S49, that is, if the candidates are not narrowed down, it is determined whether or not a flower is selected in a step S51. Here, the CPU 44a determines whether or not the button image 380 is turned on, in a state that any one of the reduced images displayed in the display region 374 is turned on. If "NO" in the step S51, that is, if a flower is not selected, the process returns to the step S49. On the other hand, if "YES" in the step S51, that is, if a flower is selected, the process proceeds to a step S73 shown in FIG. 28.

On the other hand, if "YES" in the step S49, that is, if the candidates are narrowed down, the narrowing-down condition selecting screen 400 as shown in FIG. 14 is displayed in a step S53. In a next step S55, it is determined whether or not narrowing-down condition is selected. Here, the CPU 44a determines whether or not any one of the button images displayed in the display region 424 is turned on.

If "NO" in the step S55, that is, if no button image displayed in the display region 424 is turned on, it is determined whether or not the result is to be seen in a step S57. That is, the CPU 44a determines whether or not the button image 428 is turned on. If "NO" in the step S57, that is, if the result is not to be seen, the process returns to the step S55 as it is. Although illustration is omitted, if the button image 426 is turned on, imaging again is determined, and the process returns to the step S1. On the other hand, if "YES" in the step S57, that is, if the result is to be seen, the process proceeds to a step S69 shown in FIG. 28.

On the other hand, if "YES" in the step S55, that is, if there is a selection of the narrowing-down condition, the narrowing-down condition setting screen (450) according to the narrowing-down condition as shown in FIG. 15 is displayed in a step S59. In a succeeding step S61, only the flowers which match the narrowing-down condition are displayed. That is, in the display region 458, reduced images as to the candidates (flowers) which are narrowed down according to the narrowing-down condition are displayed.

Then, in a step S63, it is determined whether or not the narrowing-down condition is decided. For example, the CPU 44a determines whether or not the button image 480 is turned on in a state that the height of the plant is selected on the narrowing-down condition setting screen 450 in FIG. 15.

If "YES" in the step S63, that is, if the narrowing-down condition is decided, the narrowing-down condition is set in a step S65, that is, the condition data 804h is updated, and the process returns to the step S53. On the other hand, if "NO" in the step S63, that is, if the narrowing-down condition is not decided, it is determined whether a skip or not in a step S67. For example, the CPU 44a determines whether or not the button image 478 is turned on on the narrowing-down condition setting screen 450 in FIG. 15.

If "NO" in the step S67, that is, if the narrowing-down condition and the skip are not decided, the process returns to the step S63. On the other hand, if "YES" in the step S67, that is, if the skip is performed, the process returns to the step S53.

Figure 28:
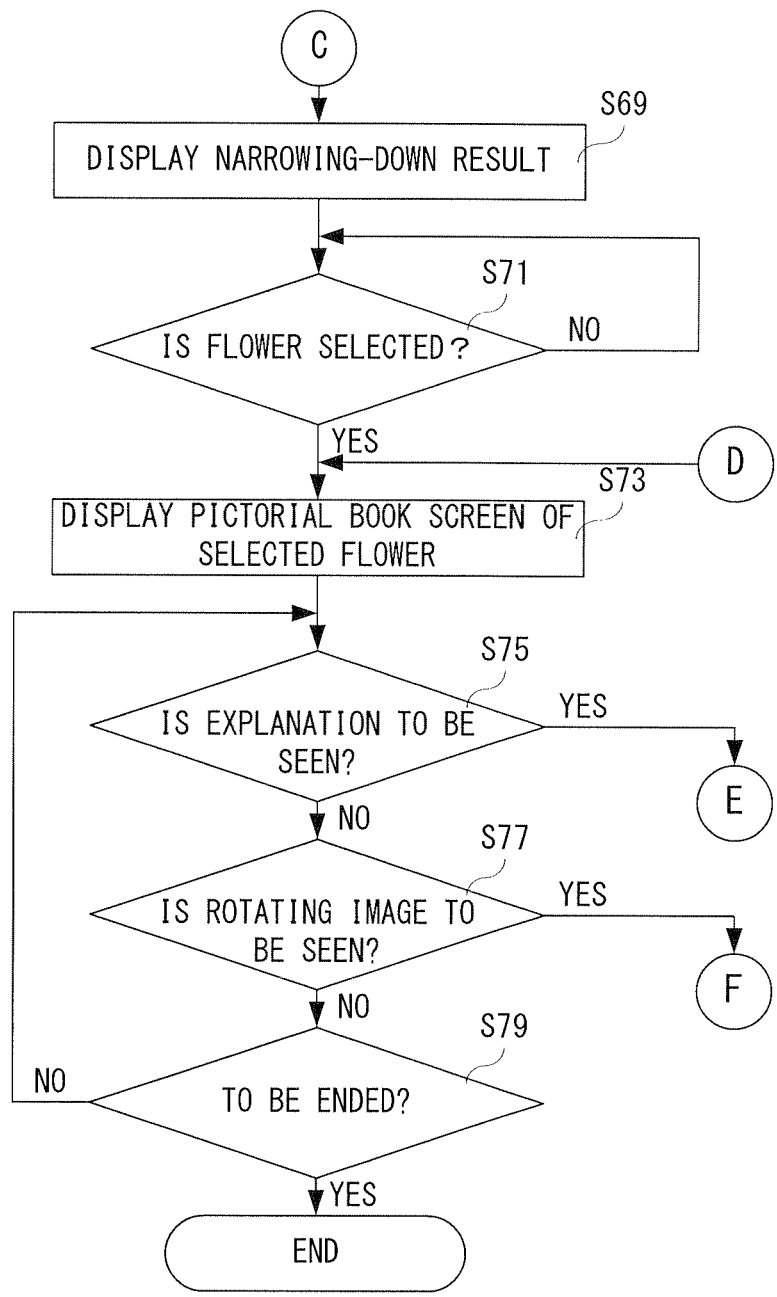
FIG. 28 shows an example non-limiting flowchart showing a fourth part of the flower examining processing by the CPU shown in FIG. 4, and being sequel to FIG. 27.

As shown in FIG. 28, in the step S69, a narrowing-down result (narrowing-down result screen) is displayed. That is, the candidates which do not match the narrowing-down condition are excluded from the search result. In a succeeding step S71, it is determined whether or not a flower is selected. Here, the CPU 44a determines whether or not a reduced image of the candidate flower is selected on the narrowing-down result screen. If "NO" in the step S71, that is, if a flower is not selected, the process returns to the step S71 as it is. On the other hand, if "YES" in the step S71, that is, if a flower is selected, the pictorial book screen of the selected flower is displayed in the step S73. Here, the pictorial book screen 550 as shown in FIG. 16 is displayed in order to display the detailed information of the selected flower.

In a succeeding step S75, it is determined whether or not an explanation is to be seen. Here, the CPU 44a determines whether or not the button image 564 is turned on. This holds true below. If "YES" in the step S75, that is, if the explanation is to be seen, the process proceeds to a step S81 shown in FIG. 29. On the other hand, if "NO" in the step S75, that is, if an explanation is not to be seen, it is determined whether or not a rotating image is to be seen in a step S77. Here, the CPU 44*a* determines whether or not the button image 566 is turned on. This holds true below.

Figure 30:
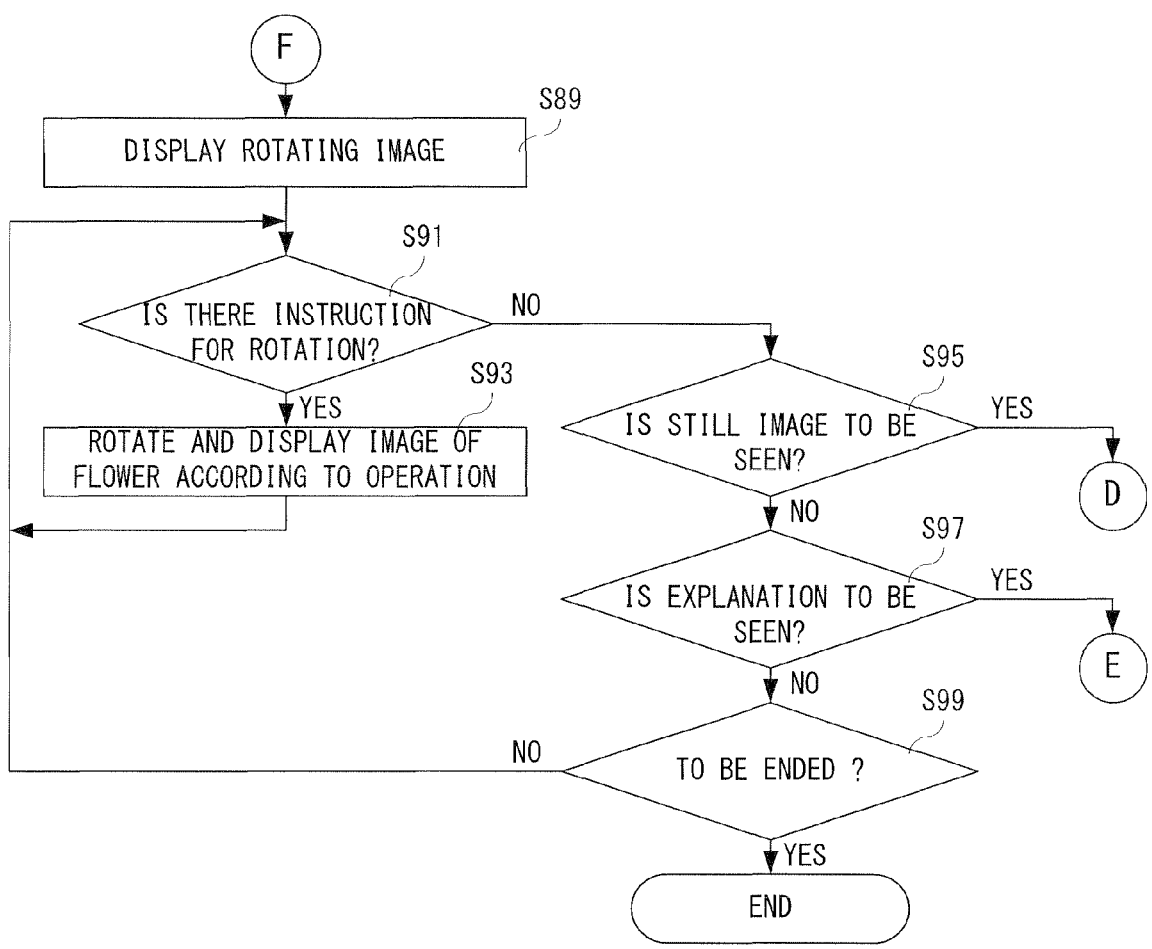
FIG. 30 shows an example non-limiting flowchart showing a sixth part of the flower examining processing by the CPU shown in FIG. 4, and being sequel to FIG. 28 and FIG. 29.

If "YES" in the step S77, that is, if a rotating image is to be seen, the process proceeds to a step S89 shown in FIG. 30. On the other hand, if "NO" in the step S77, that is, if a rotating image is not to be seen, it is determined whether or not the flower examining processing is to be ended in a step S79. Although the detailed description is omitted, an end instruction is input by the user. This holds true below. If "NO" in the step S79, that is, if it is not to be ended, the process returns to the step S75. On the other hand, if "YES" in the step S79, that is, if it is to be ended, the flower examining processing is ended.

Figure 29:
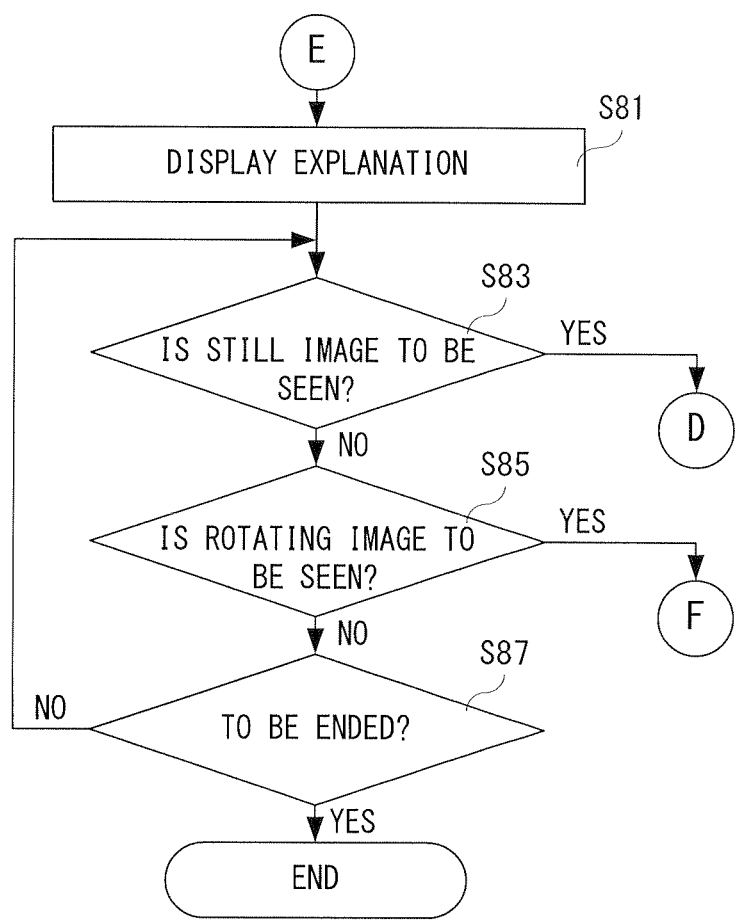
FIG. 29 shows an example non-limiting flowchart showing a fifth part of the flower examining processing by the CPU shown in FIG. 4, and being sequel to FIG. 28.

Although illustration is omitted, in the step S81 shown in FIG. 29, the pictorial book screen 550 on which the explanation is shown is displayed. In a succeeding step S83, it is determined whether or not a still image is to be seen. Here, the CPU 44*a* determines whether or not the button image 562 is turned on. This holds true below. If "YES" in the step S83, that is, if a still image is to be seen, the process returns to the step S73 shown in FIG. 28. On the other hand, if "NO" in the step S83, that is, if a still image is not to be seen, it is determined whether or not a rotating image is to be seen in a step S85.

If "YES" in the step S85, the process proceeds to the step S89 in FIG. 30. On the other hand, if "NO" in the step S85, it is determined whether or not the flower examining processing is to be ended in a step S87. If "NO" in the step S87, the process returns to the step S83 as it is. On the other hand, if "YES" in the step S87, the flower examining processing is ended.

As shown in FIG. 30, in the step S89, the pictorial book screen 550 as shown in FIG. 17 is displayed. Here, the rotating image is displayed on the display region 554 of the upper screen 550*a*. In a next step S91, it is determined whether or not there is an instruction for rotation. That is, the CPU 44*a* always detects the operation data to thereby determine whether or not the rotation button image 580 is operated, and stores (overwrites) the rotating angle data 804*j* corresponding to the rotation angle in the data memory area 804.

If "YES" in the step S91, that is, if there is an instruction for rotation, the image of the flower is rotated and displayed in accordance with an operation in a step S93, and the process returns to the step S91. In the step S93, the CPU 44*a* displays a stereoscopic image stored in correspondence with the rotation angle indicated by the rotating angle data 804*j* in the display region 554.

On the other hand, if "NO" in the step S91, that is, if there is no instruction for rotation, it is determined whether or not the still image is to be seen in a step S95. If "YES" in the step S95, the process returns to the step S73 shown in FIG. 28. On the other hand, if "NO" in the step S95, it is determined whether or not an explanation is to be seen in a step S97. If "YES" in the step S97, the process returns to the step S81 shown in FIG. 29. On the other hand, if "NO" in the step S97, it is determined whether or not the flower examining processing is to be ended in a step S99. If "NO" in the step S99, the process returns to the step S91 as it is. On the other hand, if "YES" in the step S99, that is, if the flower examining processing is to be ended, the flower examining processing is ended.

Although the illustration is omitted here, in a case that the button image 570 is turned on on the pictorial book screen 550, the CPU 44*a* displays or hides the telop. Also, although the illustration is omitted, in a case that the button image 572 is turned on on the pictorial book screen 550, the CPU 44*a* returns to the search result screen 350 or the narrowing-down result screen which has been displayed immediately before the pictorial book screen 550. Moreover, although the illustration is omitted, in a case that the button image 574 is turned on on the pictorial book screen 550, the CPU 44*a* makes a transition to a mode in which the images of the flowers imaged by the user are displayed in an album format. At this time, the flower examining processing is ended.

Figure 31:
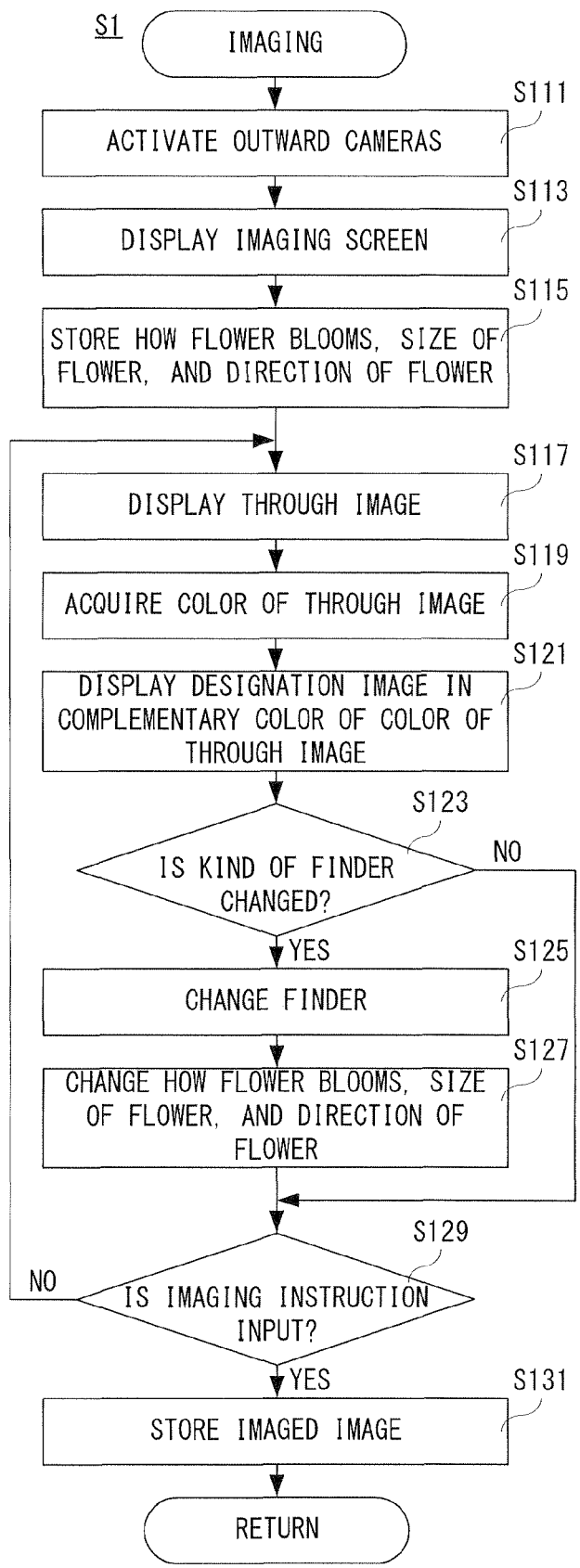
FIG. 31 shows an example non-limiting flowchart showing imaging processing by the CPU shown in FIG. 4.

FIG. 31 is a flowchart showing the imaging processing in the step S1 shown in FIG. 25. As shown in FIG. 31, when starting imaging processing, the CPU 44*a* activates the outward cameras 18*b*, 18*c* in a step S111, and displays the imaging screen 150 shown in FIG. 8 on the stereoscopic LCD 12 and the lower LCD 14 in a step S113. Then, in a step S115, how the flower blooms, the size of the flower and the direction of the flower are stored. That is, the finder data 804*c* is stored.

In a succeeding step S117, a through image captured by the outward cameras 18*b*, 18*c* is displayed on the upper screen 150*a*. In a next step S119, a color of the through image is acquired. Here, from the through image displayed on the upper screen 150*a*, color information of coordinates of one point or two or more points where the designation image (154, 180, 182, 184, 186) is displayed is acquired. Then, in a step S121, the designation image (154, 180, 182, 184, 186) is displayed in a complementary color of the acquired color of the through image. That is, the color of the designation image (154, 180, 182, 184, 186) is changed in correspondence with the color of the through image (background).

Then, in a step S123, it is determined whether or not the kind of the finder is changed. Here, it is determined whether or not the button image 172*a* or the button image 172*b* is turned on (touched), or whether or not the left push button or the right push button of the cross key 24*g* or the analog pad 26 is operated.

If "NO" in the step S123, that is, if the kind of the finder is not changed, the process proceeds to a step S129. On the other hand, if "YES" in the step S123, that is, if the kind of the finder is changed, the finder is changed in a step S125. That is, the CPU 44*a* changes the display of the display region 172*c* according to an operation by the user to display the designation image (154, 180, 182, 184, 186) and the scale image (156, 190) of the finder that are displayed in the display region 172*c*. Furthermore, in the display region 158, the kind of the selected finder is displayed, and in the display region 170, an explanatory text of the selected finder is displayed. Then, in a step S127, how the flower blooms, the size of the flower and the direction of the flower are changed, and the process proceeds to the step S129. That is, in the step S127, the finder data 804*c* is updated.

In the step S129, it is determined whether or not an imaging instruction is input. That is, the CPU 44*a* determines whether or not the button image 174 is turned on (touched), or whether or not the A button 24*a*, the L button 24*e* or the R button 24*f* is operated. If "NO" in the step S129, that is, if an imaging instruction is not input, the process returns to the step S117. On the other hand, if "YES" in the step S129, that is, if an imaging instruction is input, the imaged image data 804*d* corresponding to the imaged image (3D image) by the outward cameras 18*b*, 18*c* is stored in the data memory area 804 in a step S131, and the process returns to the flower examining processing.

Here, in this embodiment, if "NO" in the step S129, the process returns to the step S117 as it is, and if the button image 176 is turned on on the imaging screen 150 as described above, the imaging processing is ended to return to the title screen 100.

According to this embodiment, the data for search which does not match the how the flower blooms, the size of the flower and the direction of the flower that are decided by the finder used in imaging is filtered, and the data for search of the category different from the category classified based on the shape of the flower is further filtered, and therefore, the number of data for search as an object to be searched can be reduced. Accordingly, it is possible to prevent the processing load and waste of time from being taken as much as possible, and heighten the accuracy of search.

Furthermore, in this embodiment, information including a stereoscopic image is presented, and therefore, it is possible to present information with high interest. Specifically, the user can see the information of the object while imaging the object, and therefore, he or she can compare the actual object and the stereoscopic image and more enjoy the search result. Moreover, it is possible to accurately examine the imaged flower.

In addition, in this embodiment, the data for search is filtered based on the finder selected by the user, and therefore, the user viewing the result of the search can know whether his or her own selection is correct, and further enjoy searching a flower based on the imaged image.

Also, in this embodiment, the flower is searched as an object, but there is no need of being restricted thereto. For example, natural objects, natural products, and artificial materials, such as insects, fishes, cars, autocycles, sign boards, vegetables, fruits, etc. can be applied.

Additionally, there is no need of being restricted to the configuration of the game apparatus shown in this embodiment. For example, one LCD may be appropriate, or no touch panel may be provided. Alternatively, the touch panel may be provided on the two LCDs.

In addition, this embodiment can be applied to an information processing system in which respective processing for the information processing may distributedly be executed by a plurality of computers, or the like.

Moreover, in this embodiment, a flower is imaged by the game apparatus, and the candidate is searched to present the detailed information of the selected candidate, but there is no need of being restricted thereto. For example, by building a server-client network, the flower examining processing of this embodiment may be executed through communications between the server and the game apparatus. In such a case, the game apparatus images a flower according to an operation by the user, calculates the distance to the object (flower) on the basis of the imaged image, makes the user further set the first and second conditions, and transmits the finder data, the imaged image, the distance to the object and the first and second conditions to the server via a network. In response thereto, the server filters the data for search to be used, creates a similarity level list, obtains the search result, and transmits the search result to the game apparatus. In addition, when the game apparatus sets the narrowing-down condition based on the search result, it transmits the narrowing-down condition to the server. Accordingly, the server extracts candidates which match the narrowing-down condition from the search result, and transmits the result which is narrowed down to the game apparatus. Then, the game apparatus notifies a selected candidate to the server. In response thereto, the server transmits the detailed information of the notified candidate to the game apparatus. Thus, the game apparatus presents the detailed information to the user.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus comprising:
a displayer configured to provide a stereoscopic display;
a plurality of imagers which are provided to be flush with each other;
a display controller configured to display a through image imaged by said plurality of imagers on said displayer;
an index image displayer configured to display a predetermined index image being an index for imaging while being superimposed on said through image;
an index image selector configured to provide a selection of said predetermined index image corresponding to a first feature of a configuration of an object to be imaged;
a first reducer configured to reduce the number of a plurality of search targets which is previously contained on the basis of the first feature of the configuration of said object to be imaged corresponding to the predetermined index image selected by said index image selector when imaging processing is executed by said plurality of imagers;
a judger configured to judge a size of said object to be imaged on the basis of the imaged image imaged by said plurality of imagers;
a second reducer configured to further reduce the number of the plurality of search targets which has been reduced by said first reducer on the basis of a second feature of a shape of said object to be imaged which is judged based on said imaged image;
a calculator configured to calculate a similarity level between said object to be imaged and each of the search targets which is reduced in number by said second reducer on the basis of the size of the object to be imaged and the feature of said imaged image; and
a candidate presenter configured to present the search targets of a high similarity level calculated by said calculator as candidates.

2. An information processing apparatus according to claim 1, further comprising:
a condition selector configured to provide a selection of a predetermined condition as to said object to be imaged;
a deleter configured to delete said search targets which do not match the predetermined condition selected by said condition selector from the candidates, wherein
said candidate presenter is configured to present the search targets as candidates which are not deleted by said deleter.

3. An information processing apparatus according to claim 1, wherein the feature of said imaged image is color information.

4. An information processing apparatus according to claim 1, wherein the feature of said imaged image is information in relation to a shape of an object.

5. An information processing apparatus according to claim 1, wherein
said judger includes a distance calculator configured to detect a parallax between said two imagers, and to calculate a distance to said object to be imaged from a distance corresponding to the parallax and a set distance between said two imagers, and a size calculator configured to calculate the size of said object to be imaged from the distance to said object to be imaged calculated by said distance calculator and an angle of view of said imagers.

6. An information processing apparatus according to claim 1, further comprising:
a similarity level increaser configured to increase said similarity level when the degree of encounter of said object to be imaged is high.

7. An information processing apparatus according to claim 1, further comprising an information presenter configured to present information including a stereoscopic image relating to the selected search target out of the search targets as candidates presented by said candidate presenter, by means of said displayer.

8. An information processing apparatus according to claim 1, wherein
said display controller includes a color acquirer configured to acquire a color of said through image, and a color setter configured to set a color of said predetermined index image to a color different from the color of said through image.

9. An information processing apparatus according to claim 8, wherein
said color setter is configured to set the color of said predetermined index image to a complementary color of the color of said through image.

10. An information processing apparatus according to claim 8, wherein
said color acquirer is configured to acquire the color of said through image at a position where said predetermined index image is arranged.

11. An information processing apparatus according to claim 8, wherein
said predetermined index image is a frame-shaped line image for causing at least the size of said object to be imaged to conform to a predetermined size.

12. A non-transitory storage medium storing an information processing program of an information processing apparatus having a displayer which is configured to provide a stereoscopic display, and a plurality of imagers which are provided to be flush with each other, said information processing program causes a computer of said information processing apparatus to provide functionality comprising:
a display controller which displays a through image imaged by said plurality of imagers on said displayer;
an index image displayer which displays a predetermined index image being an index for imaging while being superimposed on said through image;
an index image selector which provides a selection of said predetermined index image corresponding to a first feature of a configuration of an object to be imaged;
a first reducer which reduces the number of a plurality of search targets which is previously contained on the basis of the first feature of the configuration of said object to be imaged corresponding to the predetermined index image selected by said index image selector when imaging processing is executed by said plurality of imagers;
a judger which judges a size of said object to be imaged on the basis of the imaged image imaged by said plurality of imagers;
a second reducer which further reduces the number of the plurality of search targets which has been reduced by said first reducer on the basis of a second feature of a shape of said object to be imaged which is judged based on said imaged image;
a calculator which calculates a similarity level between said object to be imaged and each of the search targets which is reduced in number by said second reducer on the basis of the size of the object to be imaged and the feature of said imaged image; and a candidate presenter which presents the search targets of a high similarity level calculated by said calculator as candidates.

13. An information processing method of an information processing apparatus having a displayer which is configured to provide a stereoscopic display, and a plurality of imagers which are provided to be flush with each other, said method comprising:
(a) displaying a through image imaged by said plurality of imagers on said displayer;
(b) displaying a predetermined index image being an index for imaging while being superimposed on said through image;
(c) providing a selection of said predetermined index image corresponding to a first feature of a configuration of an object to be imaged;
(d) reducing the number of a plurality of search targets which is previously contained on the basis of the first feature of the configuration of said object to be imaged corresponding to the predetermined index image selected by said step (c) when imaging processing is executed by said plurality of imagers;
(e) judging a size of said object to be imaged on the basis of the imaged image imaged by said plurality of imagers;
(f) further reducing the number of the plurality of search targets which has been reduced by said first reducer on the basis of a second feature of a shape of said object to be imaged which is judged based on said imaged image;
(g) calculating a similarity level between said object to be imaged and each of the search targets which is reduced in number by said step (f) on the basis of the size of the object to be imaged and the feature of said imaged image; and
(h) presenting the search targets of a high similarity level calculated by said step (g) as candidates.

14. An apparatus having a displayer which is configured to provide a stereoscopic display, and a plurality of imagers which are provided to be flush with each other, comprising:
a computer system, having at least one computer processor, the computer system being configured to:
display a through image imaged by said plurality of imagers on said displayer;
display a predetermined index image being an index for imaging while being superimposed on said through image;
provide a selection of said predetermined index image corresponding to a first feature of a configuration of an object to be imaged;
reduce the number of a plurality of search targets which is previously contained on the basis of the first feature of the configuration of said object to be imaged corresponding to the predetermined index image selected when imaging processing is executed by said plurality of imagers;
judge a size of said object to be imaged on the basis of the imaged image imaged by said plurality of imagers;
further reduce the number of the plurality of search targets which has been reduced on the basis of a second feature of a shape of said object to be imaged which is judged based on said imaged image;
calculate a similarity level between said object to be imaged and each of the search targets which is reduced in number in the further reduction on the basis of the size of the object to be imaged and the feature of said imaged image; and present the search targets of a high similarity level calculated by said calculator as candidates.

* * * * *